US009943825B2

(12) United States Patent
Morikawa et al.

(10) Patent No.: US 9,943,825 B2
(45) Date of Patent: Apr. 17, 2018

(54) POROUS GRAFT COPOLYMER PARTICLES, METHOD FOR PRODUCING SAME, AND ADSORBENT MATERIAL USING SAME

(71) Applicant: KURARAY CO., LTD., Kurashiki-shi (JP)

(72) Inventors: Keisuke Morikawa, Kurashiki (JP); Yusuke Amano, Kurashiki (JP); Naoyuki Iwachido, Kurashiki (JP); Naoki Fujiwara, Kurashiki (JP); Takumi Takayama, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/692,986

(22) Filed: Apr. 22, 2015

(65) Prior Publication Data
US 2015/0224472 A1 Aug. 13, 2015

Related U.S. Application Data

(63) Continuation of application No. PCT/JP2013/079302, filed on Oct. 29, 2013.

(30) Foreign Application Priority Data

| Oct. 30, 2012 | (JP) | 2012-238998 |
| Nov. 15, 2012 | (JP) | 2012-250757 |
| Nov. 15, 2012 | (JP) | 2012-250758 |
| Jan. 23, 2013 | (JP) | 2013-010411 |
| Mar. 14, 2013 | (JP) | 2013-051931 |
| Jul. 31, 2013 | (JP) | 2013-158515 |

(51) Int. Cl.
| *B01J 20/00* | (2006.01) |
| *B32B 5/16* | (2006.01) |
| *B01J 20/26* | (2006.01) |
| *B01D 15/00* | (2006.01) |
| *B01J 20/30* | (2006.01) |
| *C08F 255/02* | (2006.01) |
| *C08J 9/26* | (2006.01) |
(Continued)

(52) U.S. Cl.
CPC ............ *B01J 20/264* (2013.01); *B01D 15/00* (2013.01); *B01J 20/28004* (2013.01); *B01J 20/28016* (2013.01); *B01J 20/28083* (2013.01); *B01J 20/28085* (2013.01); *B01J 20/30* (2013.01); *B01J 20/3014* (2013.01); *B01J 20/3028* (2013.01); *B01J 20/3071* (2013.01); *B01J 20/3078* (2013.01); *B01J 20/3085* (2013.01); *B01J 20/321* (2013.01); *B01J 20/3212* (2013.01); *B01J 20/3219* (2013.01); *B01J 20/3272* (2013.01); *B01J 20/3278* (2013.01); *B01J 20/3293* (2013.01); *B01J 20/3425* (2013.01); *B01J 20/3475* (2013.01); *B01J 39/18* (2013.01); *C08F 8/32* (2013.01); *C08F 255/02* (2013.01); *C08F 261/04* (2013.01); *C08F 271/02* (2013.01); *C08J 3/12* (2013.01); *C08J 9/26* (2013.01); *C22B 3/24* (2013.01); *C02F 1/285* (2013.01); *C02F 2101/20* (2013.01); *C02F 2101/22* (2013.01); *C08J 2201/046* (2013.01); *C08J 2323/08* (2013.01); *C08J 2329/04* (2013.01); *C08J 2351/06* (2013.01); *C08J 2429/04* (2013.01); *C08J 2451/06* (2013.01); *Y02P 10/234* (2015.11); *Y10T 428/2982* (2015.01)

(58) Field of Classification Search
CPC ..................... B01J 20/28054; C08F 2800/20
USPC .................... 428/402.24, 403, 407
See application file for complete search history.

(56) References Cited

U.S. PATENT DOCUMENTS

| 5,929,214 A | * | 7/1999 | Peters | ................. B01D 15/327 530/412 |
| 7,022,744 B2 | | 4/2006 | Haginaka et al. | |
(Continued)

FOREIGN PATENT DOCUMENTS

| CN | 100491472 C | 5/2009 |
| EA | 017034 | 9/2012 |
(Continued)

OTHER PUBLICATIONS

ThermoFisher Scientific brochure, Microspheres and Nanocrystals, 2017.*
Extended European Search Report dated Jul. 12, 2016 in Patent Application No. 13851377.5.
International Search Report dated Jan. 14, 2014 in PCT/JP2013/079302 filed Oct. 29, 2013.
Combined Chinese Office Action and Search Report dated Oct. 27, 2016 in Chinese Patent Application No. 201380057049.4 (w/English Language translation of Search Report and English translation of Category of Cited Documents).
(Continued)

*Primary Examiner* — Hoa T Le
(74) *Attorney, Agent, or Firm* — Oblon, McClelland, Maier & Neustadt, L.L.P.

(57) ABSTRACT

Provided are graft copolymer particles enabling introduction of adsorptive functional groups adsorbing metals and others, a method for producing same, and an adsorbent using same. (1) Porous graft copolymer particles containing graft chains introduced into porous particles (particle surface having an average pore diameter of 0.01-50 μm) including at least one resin selected from olefin resins, water-insoluble modified polyvinyl alcohol resins, amide resins, cellulosic resins, chitosan resins and (meth)acrylate resins. (2) A method for producing porous graft copolymer particles including (I) melt-kneading a polymer A and a polymer B other than the polymer A to obtain a compound material, (II) extracting and removing the polymer B from the compound material to obtain a porous material of the polymer A, (III) granulating the porous material, and (IV) introducing graft chains into the porous particles. (3) An adsorbent of porous graft copolymer particles.

11 Claims, No Drawings

(51) Int. Cl.
*C22B 3/24* (2006.01)
*B01J 20/34* (2006.01)
*B01J 20/32* (2006.01)
*B01J 20/28* (2006.01)
*B01J 39/18* (2017.01)
*C08F 261/04* (2006.01)
*C08J 3/12* (2006.01)
*C08F 271/02* (2006.01)
*C08F 8/32* (2006.01)
*C02F 1/28* (2006.01)
*C02F 101/20* (2006.01)
*C02F 101/22* (2006.01)

(56) References Cited

U.S. PATENT DOCUMENTS

| | | |
|---|---|---|
| 7,060,187 B2 | 6/2006 | Ihre et al. |
| 7,119,145 B2 | 10/2006 | Dixon et al. |
| 7,135,230 B2 | 11/2006 | Nakao et al. |
| 7,758,953 B2 | 7/2010 | Koizumi et al. |
| 8,110,289 B2 | 2/2012 | Koizumi et al. |
| 2003/0144421 A1 | 7/2003 | Dixon et al. |
| 2004/0019125 A1 | 1/2004 | Haginaka et al. |
| 2004/0023029 A1 | 2/2004 | Nakao et al. |
| 2004/0101442 A1* | 5/2004 | Frechet ............. B01L 3/502707 422/506 |
| 2004/0212123 A1 | 10/2004 | Koizumi et al. |
| 2004/0262228 A1 | 12/2004 | Ihre |
| 2005/0065282 A1 | 3/2005 | Ihre et al. |
| 2005/0239925 A1* | 10/2005 | Ito ............................. C08J 9/26 524/27 |
| 2007/0007196 A1 | 1/2007 | Komatsu et al. |
| 2007/0163332 A1* | 7/2007 | Tsujii ...................... B01J 20/26 73/61.52 |
| 2009/0170981 A1 | 7/2009 | Ito |
| 2010/0203335 A1 | 8/2010 | Koizumi et al. |
| 2014/0363653 A1* | 12/2014 | Hori ........................ C02F 1/285 428/219 |

FOREIGN PATENT DOCUMENTS

| | | |
|---|---|---|
| EP | 0 519 341 A1 | 12/1992 |
| EP | 1 437 376 A1 | 7/2004 |
| EP | 1 512 725 A1 | 3/2005 |
| EP | 2623549 A1 | 8/2013 |
| JP | 55-146874 A | 11/1980 |
| JP | 61-163222 A | 7/1986 |
| JP | 63-92646 A | 4/1988 |
| JP | 2-187143 | 7/1990 |
| JP | 4-284846 A | 10/1992 |
| JP | 5-178943 A | 7/1993 |
| JP | 7-24314 | 1/1995 |
| JP | 9-165464 | 6/1997 |
| JP | 10-60149 | 3/1998 |
| JP | 2000-309609 A | 11/2000 |
| JP | 2001-187809 | 7/2001 |
| JP | 2003-112060 | 4/2003 |
| JP | 2003-236512 | 8/2003 |
| JP | 2004-51942 A | 2/2004 |
| JP | 2004-083561 | 3/2004 |
| JP | 2004-330056 A | 11/2004 |
| JP | 2005-510609 | 4/2005 |
| JP | 2005-516088 A | 6/2005 |
| JP | 2005-331510 | 12/2005 |
| JP | 2006-346543 | 12/2006 |
| JP | 4198460 B2 | 10/2008 |
| JP | 2009-13204 | 1/2009 |
| JP | 2009-101289 | 5/2009 |
| JP | 2010-001392 | 1/2010 |
| JP | 2010-179208 A | 8/2010 |
| JP | 2010-189829 | 9/2010 |
| JP | 2010-233825 | 10/2010 |
| JP | 2011-16036 | 1/2011 |
| JP | 2011-084783 | 4/2011 |
| JP | 2012-31294 A | 2/2012 |
| JP | 2012-067267 | 4/2012 |
| JP | 2012-096175 | 5/2012 |
| JP | 2013-6942 | 1/2013 |
| JP | 2013-136035 | 7/2013 |
| WO | WO 02/33135 A1 | 4/2002 |
| WO | WO 02/064654 A1 | 8/2002 |
| WO | WO 03/046063 A1 | 6/2003 |
| WO | WO 03/064478 A2 | 8/2003 |
| WO | WO 2008/038624 A1 | 4/2008 |
| WO | WO 2012/043347 A1 | 4/2012 |
| WO | WO 2013/084524 A1 | 6/2013 |

OTHER PUBLICATIONS

Chinese Office Action dated Jul. 4, 2017 in Patent Application No. 201380057049.4 (with Partial English Translation).
Japanese Office Action dated Feb. 7, 2017 in Patent Application No. 2013-235647 (with partial English translation).
Decision of Grant dated Apr. 25, 2017 in Japanese Patent Application No. 2013-225907.
Notification of Reason(s) for Rejection dated May 2, 2017 in Japanese Patent Application No. 2013-158515 (with English summary of Notification of Reason(s) for Rejection).
Notification of Reason(s) for Rejection dated Mar. 14, 2017 in Japanese Patent Application No. 2013-235648 (with English summary of Notification of Reason(s) for Rejection).
Decision of Grant dated May 2, 2017 in Japanese Patent Application No. 2013-247900.
Office Action dated Aug. 1, 2017, in Japanese patent application No. 2013-235647.
First Office Action dated Aug. 30, 2017, in Russian patent application No. 2015120060 (w/partial English translation).
Office Action dated Oct. 31, 2017, in Japanese patent application No. 2014-043166 (w/English translation).
Wang et al, "Dynamic adsorption behavior and mechanism of transition metal ions on silica gels functionalized with hydroxyl- or amino-terminated polyamines", *Chemical Eng. Journal*, 2013, vol. 221, pp. 264-274.
Tokuyama et al, "Temperature swing adsorption of gold(III) ions on poly(N-isopropylacrylamide) gel", *Reactive & Functional Polymers*, 2006, vol. 67. pp. 136-143.
Morozova et al, "Modified with unithiol copolymers of ethylene glycol vinyl glycidyl diester as gold sorbents", *Doklady Akademii Nauk*, 1992, vol. 326, No. 5, pp. 835-837.
Office Action dated Nov. 7, 2017, in Japanese application No. 2013-158515.
Japanese Office Action dated Dec. 20, 2016 in patent application No. 2013-225906 (with English summary).
Japanese Office Action dated Jan. 31, 2017 in patent application No. 2013-225907 (with English summary).

* cited by examiner

POROUS GRAFT COPOLYMER PARTICLES, METHOD FOR PRODUCING SAME, AND ADSORBENT MATERIAL USING SAME

CROSS REFERENCE TO THE RELATED APPLICATION

This application is a continuation application, under 35 U.S.C. § 111(a), of international application No. PCT/JP2013/079302, filed Oct. 29, 2013, which claims priority to Japanese Patent Application No. 2012-238998, filed on Oct. 30, 2012, Japanese Patent Application No. 2012-250757 and Japanese Patent Application No. 2012-250758, both filed on Nov. 15, 2012, Japanese Patent Application No. 2013-10411, filed on Jan. 23, 2013, Japanese Patent Application No. 2013-51931, filed on Mar. 14, 2013, and Japanese Patent Application No. 2013-158515, filed on Jul. 31, 2013, the entire disclosure of each of which is herein incorporated by reference as a part of this application.

FIELD OF THE INVENTION

The present invention relates to porous graft copolymer particles having adsorptive functional groups in graft chains, making it possible to adsorb and recover various metals including platinum group metals in an efficient way, to a method thereof, and to an adsorbent (adsorbent material) using the porous graft copolymer particles.

BACKGROUND ART

Recent years, as for metal resources such as rare metals, growing demand thereof and limited supply due to resource nationalism make market supply unstable, leading to supply anxiety and steep rise in metal prices. Such a situation leads to vigorous development in construction of technology and mechanism for recycling used products, and further energetic development in technology to reduce loss as much as possible in recovering and/or smelting process.

As methods for separating and recovering metals from metal-containing materials, there have been known an electrolytic smelting method, a flocculation precipitation method, a solvent extraction method, an adsorption method, and others. Among them, the adsorption method in which metals are recovered by using adsorbents is believed to be suitable for industrial practice, and various studies have been carried out.

Widely used adsorbents include one comprising a polymer substrate having an ion-exchange or chelating group introduced thereinto, the group having a high affinity for metals to be recovered. However, such an adsorbent has problems that the polymer substrate is generally less reactive and is limited in number and type of functional groups to be introduced.

In order to overcome the above problems, as a method for introducing ion-exchanging groups or chelating groups, an adsorbent has been known which comprising a porous polyolefin sheet having an adsorptive functional group-containing graft chain introduced thereinto by radiation-induced graft polymerization (Patent Document 1). Further, there has been known a metal ion adsorbent carrying extraction reagents, the adsorbent being obtained by graft-polymerizing polymerizable monomers carrying extracting reagents on a surface of a porous membrane (Patent Document 2).

As a method for introducing an adsorptive functional group by blending polymers, there have been known metal (particularly platinum metal) ion adsorbent particles obtained by extruding a composition comprising a polyethyleneimine and an ethylene-vinyl alcohol copolymer or a composition comprising a polyethyleneimine, an ethylene-vinyl alcohol copolymer and an amine-based polymer to form a strand, followed by pulverizing the strand (Patent Document 3).

Further, Patent Document 4 discloses an anion exchanging body having graft chains in which quaternary ammonium groups are introduced to an ethylene-vinyl alcohol copolymer by ionizing irradiation. In Examples of this document, an ethylene-vinyl alcohol copolymer is irradiated by ionizing radiation to introduce quaternary ammonium groups in a graft ratio of 60%.

RELATED ART DOCUMENTS

Patent Documents

[Patent Document 1] JP Laid-open Patent Publication No. 2009-101289
[Patent Document 2] JP Laid-open Patent Publication No. 2005-331510
[Patent Document 3] JP Laid-open Patent Publication No. 2012-67267
[Patent Document 4] JP Laid-open Patent Publication No. 2010-1392

SUMMARY OF THE INVENTION

Problems to be Solved by the Invention

However, the sheet like adsorbing material described in Patent Document 1 is not suitable to be used for packing, for example, in a column and has limitation on use forms. Further, since the sheet like material has a hollow fiber shape having a low bulk density, the amount of functional groups introduced to the sheet per volume comes to be small, resulting in insufficient adsorption performance.

Further, the extraction reagents carried by the adsorbent described in Patent Document 2 are not chemically bonded to the substrate. As a result, there is a concern that the extraction reagents are eluted under a certain condition, resulting in reduced adsorption performance. Moreover, the membrane like adsorbing material also has laminations on the usage forms for the same reasons as set forth in the preceding paragraph.

The metal ion adsorbent according to Patent Document 3 must comprise the ethylene-vinyl alcohol copolymer to be mixed in a proportion of 60 wt % or higher to impart durability to the adsorbent. In addition, because of the melt kneading procedure, most of the functional groups having metal ion adsorptive property come to reside inside of the ethylene-vinyl alcohol copolymer so as to cause insufficient contact with the metal ions, resulting in failing to exhibit sufficient adsorption performance.

The anion exchanging body obtained in Patent Document 4 does not exhibit sufficient adsorption performance. Further, the anion exchanging body causes too much swelling due to increased hydrophilicity where the anion exchanging body comprising the described quaternary ammonium salts as adsorbing groups in an increased amount in order to exhibit sufficient adsorption performance, resulting in difficulty in taking out the anion exchanging body after fabrication. Further, even if the anion exchanging body can be prepared, there is also a problem that usage of the anion exchanging body is difficult in an aqueous solution containing metal ions.

Therefore, an object of the present invention is to provide porous graft copolymer particles (i) to which ion exchanging groups or chelating groups can be easily introduced, (ii) achieving introduction of functional groups in high amount, (iii) having porous structure making it easy to bring the particles into contact with adsorbate metals, and (iv) having particle structure making it easy to be filled in a column, so as to be useful as ion-exchange resin or chelate resin; a manufacturing method thereof; and an adsorbent comprising the porous graft copolymer particles.

Means for Solving the Problems

As a result of intensive studies to achieve the above object, the inventors of the present invention have found that porous graft copolymer particles being excellent in handleabity as well as having high adsorption property can be obtained by producing substrate particles from a highly moldable resin, forming porous substrate particles therefrom, and further irradiating the porous substrate particles by ionizing radiation to introduce graft chains thereinto. The present invention has been completed based on these findings.

A first aspect of the present invention is a porous graft copolymer particle comprising a graft copolymer having a porous particulate shape, the graft copolymer comprising at least one resin selected from the group consisting of an olefin resin, a water-insoluble modified polyvinyl alcohol resin, an amide resin, a cellulosic resin, a chitosan resin and a (meth)acrylate resin, the resin having a graft chain introduced thereinto, and the particle having an average pore diameter in a range from 0.01 µm to 50 µm on the surface thereof.

In the present invention, the "porous particle" refers to a particle having a plurality of pores. It should be noted that the pores may have continuous structures or independent structures.

Further, in the present invention the term "particle" refers to a concept embracing powder.

In the porous graft copolymer particle, the water-insoluble modified polyvinyl alcohol resin may be preferably an ethylene-vinyl alcohol copolymer.

In the porous graft copolymer particle, the graft chain may preferably comprise a structural unit having a functional group.

In the porous graft copolymer particle, the graft chain may preferably comprise a structural unit having at least one functional group selected from the group consisting of an amino group, an amide group, an ether group, a carboxyl group, a thiourea group, an isothiourea group, a phosphoric acid group, a phosphonic acid group, an amidoxime group, a nitrile group, a sulfonyl group, an N-methylglucamine group, an epoxy group, and a thiol group. Among them, the graft chain may preferably comprise a structural unit having at least one functional group selected from the group consisting of an amino group, an ether group, a thiourea group and an isothiourea group.

In the porous graft copolymer particle, the amount of functional group to be introduced is preferably 1.0 mmol/g or more.

In the porous graft copolymer particle, the particle size is preferably from 10 µm to 2,000 µm.

A second aspect of the present invention is a method for producing porous graft copolymer particles having an average pore diameter in a range from 0.01 µm to 50 µm on the surface thereof, the method comprising:

(I) melt-kneading at least one resin (hereinafter sometimes referred to as polymer A) selected from the group consisting of an olefin resin, a water-insoluble modified polyvinyl alcohol resin, an amide resin, a chitosan resin, a cellulosic resin and a (meth)acrylate resin, and another resin (hereinafter sometimes referred to as polymer B) other than the polymer A, cooling and solidifying the resulting molten resin mixture to obtain a solidified mixture, (II) extracting and removing the polymer B from the solidified mixture to obtain a porous substrate of the polymer A, (III) granulating the solidified mixture or the porous substrate after (I) or (II) to obtain particles, and (IV) introducing a graft chain(s) into the porous particles.

In the method described above, the polymer A is preferably an ethylene-vinyl alcohol copolymer, and the polymer B is preferably a water soluble polymer, more preferably a polyvinyl alcohol.

In the method described above, the introduction of the graft chain is preferably carried out by radiation-induced graft polymerization with ionizing radiation.

In the manufacturing method, the graft chain may include a structural unit having a functional group. The functional group may be converted into another functional group after graft polymerization.

A third aspect of the present invention is an adsorbent (adsorbent material) made of the porous graft copolymer particle as described above. The adsorbent may be an adsorbent for metal adsorption.

It should be noted that any combination of at least two constructions, disclosed in the appended claims and/or the specification should be construed as included within the scope of the present invention. In particular, any combination of two or more of the appended claims should be equally construed as included within the scope of the present invention.

Effect of the Invention

According to the porous graft copolymer particle of the present invention, since the porous graft copolymer particle comprises a porous polymer as a base substrate and a graft chain(s) making it possible to introduce adsorptive functional groups to a high degree, a large amount of adsorptive functional groups can be introduced into the base substrate so as for the porous graft copolymer particle to achieve excellent metal adsorption. Further the particle shape of the porous graft copolymer contributes to efficient filling or packing into a column, leading to excellent applicability as metal adsorbents. By using thus obtained metal adsorbent, it is possible to recover metals in a high yield.

According to the method for producing porous graft copolymer particles of the present invention, since the method comprises melt-kneading a polymer (polymer A) excellent in moldability with another polymer (polymer B) to obtain a polymer mixture, extracting and removing the polymer B with a solvent being a good solvent for the polymer B while being a non-solvent for the polymer A to obtain porous polymer particles, and introducing graft chains into the porous polymer particles by graft polymerization of polymerizable monomers having functional groups, it is possible to produce porous graft copolymer particles having functional groups introduced in a high amount so as to make it possible to allow metals in easier contact with the particles, and having excellent adsorptive property.

According to the adsorbent comprising porous graft copolymer particles of the present invention, since the adsorbent has a porous structure enabling introduction of functional groups in a large amount, the adsorbent is excellent in metal adsorption and has good column filling or packing property thanks to the particle shape thereof.

DESCRIPTION OF EMBODIMENTS (Porous Graft Copolymer Particle)

The porous graft copolymer particle according to the present invention is a porous graft copolymer particle comprising a porous particulate polymer A (at least one resin or polymer selected from the group consisting of an olefin resin, an amide resin, a water-insoluble modified polyvinyl alcohol resin, a cellulosic resin, a chitosan resin and a (meth)acrylate resin) as a backbone polymer (trunk polymer) and a graft chain introduced into the polymer A. The particle has an average pore diameter in a range from 0.01 µm to 50 µm on the surface of the particle.

(Backbone Polymer)

The polymer A according to the present invention has excellent moldability, and is at least one resin or polymer selected from the group consisting of an olefin resin, an amide resin, a water-insoluble modified polyvinyl alcohol resin, a cellulosic resin, a chitosan resin and a (meth)acrylate resin. By using the above polymer as a backbone polymer (substrate), a graft chain can be introduced by graft polymerizing unsaturated monomers having functional groups as described below to obtain the resulting graft copolymer of the present invention.

As the olefin resin used in the present invention, there may be mentioned a polyethylene, a polypropylene, an ethylene-propylene copolymer, a halogenated polyolefin such as a polyvinylidene fluoride, and the like.

As the water-insoluble modified polyvinyl alcohol resin, there may be mentioned a water-insoluble modified polyvinyl alcohol resin in order to realize a porous structure after eluting a water-soluble polymer described later, for example, an ethylene-vinyl alcohol copolymer, a polyvinyl acetal such as a polyvinyl butyral. The modified polyvinyl alcohol resins are usually capable of maintaining the structure in hot water at 100° C.

As the amide resin, there may be mentioned a nylon 6; a nylon 6,6; a nylon 6,10; a nylon 6,12; a nylon 11; a nylon 12; a nylon 4,6; and the like.

As the cellulosic resin, there may be mentioned a cellulose (a pulp, a cotton linter, a regenerated cellulose, etc.), and a cellulose acylate such as a cellulose triacetate, a cellulose diacetate, a cellulose acetate butyrate, a cellulose acetate propionate, and the like.

As the (meth)acrylic ester resin, there may be mentioned a poly(methyl(meth)acrylate); a poly(ethyl(meth)acrylate); a poly(propyl(meth)acrylate); various copolymers such as a copolymer of (meth)acrylate and (meth)acrylic acid, a copolymer of (meth)acrylate and styrene, etc.; and the like.

As the chitosan resin, there may be mentioned a partially/fully deacetylated structure obtained from a chitin having (1→4)-2-acetamido-2-deoxy-β-D-glucan structure; chitosan derivatives in which a portion of an amino group obtained by deacetylation of the structure or a portion of the hydroxyl groups in the same molecule has been chemically modified by acylation, etherification, esterification and other reaction; and the like.

(Ethylene-Vinyl Alcohol Copolymer)

Among the above polymers, ethylene-vinyl alcohol copolymers are preferable because the ethylene-vinyl alcohol copolymers are formable into particles having water resistance, as well as have hydrophilic property so as for metal ions to diffuse easily in the resin.

The ethylene-vinyl alcohol copolymer used as a base substrate of the graft copolymer of the present invention is not particularly limited to a specific one as long as it is possible to obtain a graft copolymer having the properties above. The ethylene content in the copolymer may be, for example, about 10 to 60% by mole, and preferably 20 to 50% by mole. The ethylene-vinyl alcohol copolymer having ethylene content of lower than 10% by mole may cause reduced water resistance of the graft copolymer obtained. On the other hand, it is difficult to manufacture and obtain the one having ethylene content exceeding 60% by mole.

The ethylene-vinyl alcohol copolymer may have a saponification degree of preferably 90% by mole or higher, more preferably 95% by mole or higher, and still more preferably 99% by mole or higher. The ethylene-vinyl alcohol copolymer having a saponification degree of lower than 90% by mole may have deteriorated moldability or there is a possibility that water resistance of the graft copolymer becomes poor.

The melt flow rate (MFR: 210° C., load of 2160 g) of ethylene-vinyl alcohol copolymer is not limited to a specific one, and may be preferably 0.1 g/min or higher, more preferably 0.5 g/min or higher. The ethylene-vinyl alcohol copolymer having a melt flow rate of lower than 0.1 g/min below may have reduced water resistance and strength. It should be noted that the upper limit of the melt flow rate may be in a range usually used, for example, may be 25 g/min or lower.

The ethylene-vinyl alcohol copolymer according to the present invention may also contain another unsaturated monomer unit within a range that does not impair the effect of the invention. The content of the unsaturated monomer unit is preferably 10% by mole or lower and more preferably 5% by mole or lower.

The ethylene-vinyl alcohol copolymer can be used alone or in combination of two or more.

(Graft Chain)

In the porous graft copolymer particle according to the present invention, the functional group to be introduced into the graft chain may preferably include a structural unit having at least one functional group (adsorptive functional group) selected from the group consisting of an amino group, an amide group, an ether group, a carboxyl group, a thiourea group, an isothiourea group, a phosphoric acid group, a phosphonic acid group, an amidoxime group, a nitrile group, a sulfonyl group, an N-methylglucamine group, an epoxy group and a thiol group in view of affinity with metals as well as metal-adsorbing or metal-binding ability. In particular, the porous graft copolymer particle is preferably a graft copolymer particle including a structural unit having at least one functional group selected from the group consisting of an amino group, an ether group, a thiourea group and an isothiourea group. The above functional groups may be introduced into the graft chains by graft polymerizing functional group-containing unsaturated monomers onto the backbone polymer described above.

The amount of the functional groups to be introduced, i.e., the number of moles of functional groups per unit mass of the graft copolymer particles is not particularly limited to a specific one. In view of the adsorption performance of metals or the like, the introduction amount may be preferably 1.0 mmol/g or more, more preferably 2.0 mmol/g or more, and still more preferably 4.0 mmol/g or more. If the introduction amount is less than 1.0 mmol/g less, there is a possibility that the adsorption performance for the metals cannot be obtained sufficiently. On the other hand, if the number of moles of functional groups is greater than 20 mmol/g, it is sometimes difficult both to produce and to suppress swelling of the particles.

(Examples of Functional Groups)

As for the functional groups to be introduced into the graft chains, it is possible to form a graft chain having functional groups by graft polymerizing the functional group-containing unsaturated monomers onto the backbone polymer (base substrate). Specific examples of the unsaturated monomers each having a functional group to be used in the graft polymerization will be described below.

(1. Amino Group)

Examples of the unsaturated monomers each having an amino group used for graft polymerization are not particularly limited to a specific one. For example, an unsaturated monomer represented by Formula (1) can be used.

[Chem. 1]

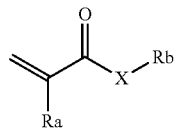

(1)

In the formula (1), Ra is hydrogen or methyl. X is a unit being capable of forming an ester bond or an amide bond with the adjacent carbonyl group. In view of chemical stability, $R_2$ is preferably methyl group.

In the formula (1), Rb may contain an amino group, for example, an amino group; an aliphatic amino group having 2 to 20 carbon atoms such as 1-amino-N-methylamino group, N,N-dimethylamino group, N-ethylamino group, N,N-diethylamino group, a pyrrolidine group, a piperidine group, a piperazine group; an aromatic amino group having 2 to 20 carbon atoms such as a pyrrole group, an imidazole group, a pyrazole group, a pyridine group, a pyridazine group, a pyrimidine group, a pyrazine group, a quinoline group, an isoquinoline group, a quinoxaline group, a cinnoline group, a benzimidazoline group, an indole group, a triazine group, a triazole group, a tetrazole group, an oxazole group, an isoxazole group, an oxadiazole group, an oxatriazole group, a purine group, a pteridine group, and the like.

Moreover, Rb may comprise an alkylene chain having 2 to 20 carbon atoms, which may be substituted, and may have an aromatic nitrogen-containing heterocyclic ring structure exemplified above at the end.

As the unsaturated monomer having an amino group, there may be exemplified an aminoalkyl(meth)acrylate [for example, a mono- or di-$C_{1-4}$alkylamino$C_{1-4}$alkyl(meth)acrylate such as an N,N-dimethylaminoethyl(meth)acrylate, and an N,N-diethylaminoethyl(meth)acrylate], an aminoalkyl(meth)acrylamide [for example, a mono- or di-$C_{1-4}$alkylamino$C_{1-4}$alkyl(meth)acrylamide such as N,N-dimethylaminoethyl(meth)acrylamide, N,N-diethylaminoethyl(meth)acrylamide, and N,N-dimethylaminopropyl(meth)acrylamide], a vinylpyridine [(2-vinylpyridine, 4-vinylpyridine, etc.), an N-vinylcarbazole, etc.], a vinylimidazole [(1-vinylimidazole, 2-vinylimidazole, 1-methyl-2-vinyl imidazole) etc.], a vinyl triazole [(2-vinyl-1,2,4-triazole) etc.].

Further, the unsaturated monomer to be graft-polymerized may have a reactive group which is convertible to an amino group after polymerization. There may be mentioned as such monomers, for example, glycidyl methacrylate, glycidyl acrylate, chloroethyl methacrylate, chloroethyl acrylate, chloromethyl styrene, and the like.

As a method for converting the reactive group to an amino group, there may be mentioned, for example, a method of adding a compound having an amino group to an epoxy group or a halogenated alkyl group. The compound having an amino group may be, for example, ethylenediamine, trimethylenediamine, 2-methyl-1,3-propanediamine, propylenediamine, tetramethylenediamine, 3-methyl-aminopropylamine, 1,3-diamino-2-propanol, 2-methyl-1,2-propanediamine, N-methylethylenediamine, N,N'-dimethylethylenediamine, 1,4-butanediamine, 1,3-pentanediamine, 1,4-cyclohexanediamine, 1,3-cyclohexanediamine, trans-1,2-cyclohexanediamine, 2-methyl-1,5-pentanediamine, 1,5-pentanediamine, heptamethylenediamine, octamethylenediamine, nonamethylenediamine, decamethylenediamine, N-(2-aminoethyl)piperazine, diethylenetriamine, triethylenetetramine, tetraethylenepentamine, pentamethylenehexamine, hexamethyleneheptamine, a polyvinylamine, a polyallylamine, a polyethyleneimine, 2-amino-benzylamine, 3-amino-benzylamine, 4-amino-benzylamine, benzylamine, 2-aminopyridine, 3-aminopyridine, 4-aminopyridine, 4-(methylamino)pyridine, 4-amino-(2-methyl)pyridine, 4-amino-(3-methyl)pyridine, 2-picolylamine, 3-picolylamine, 4-picolylamine, 4-(ethylamino)pyridine, 3-(2-aminomethyl)pyridine, 2-(2-aminoethyl)pyridine, bis(3-pyridylmethyl)amine, bis(2-pyridylmethyl)amine, 2-amino-4-methylpyridine, 3-amino-4-methylpyridine, an imidazole compound (for example, 2-aminoimidazole, 1-(3-aminopropyl)imidazole, 2-aminobenzimidazole), a triazole compound (for example, 4-amino-1,2,4-triazole, 3-amino-1H-1,2,4-triazole), a benzotriazole compound (for example, 1-hydroxybenzotriazole, 1-aminobenzotriazole), 4-amino-indole, 5-amino-indole, 6-amino-indole, histamine, tryptamine, tryptophan, and the like. Among them, particularly preferable compounds include a polyvalent amine, an imidazole compound, a triazole compound and a benzotriazole compound from the viewpoint of easy manufacturing and metal ion adsorption performance.

Among the methods for introducing amino groups into a graft chain, as a method for introducing amino groups in a large amount, preferable methods include a method comprising converting an epoxy group to an amino group after graft polymerization of glycidyl methacrylate and/or glycidyl acrylate. In addition, it is also preferable to introduce an amino group via glycidyl methacrylate and/or glycidyl acrylate in terms of achieving moderate water resistance because the epoxy group and a hydroxyl group in the ethylene-vinyl alcohol copolymer can be partially cross-linked at the time introducing the epoxy group or the amino group.

(2. Thiourea or Isothiourea Group)

The structure unit of a thiourea or an isothiourea group contained in a graft chain of the graft copolymer according to the present invention is not particularly limited to a specific one. For example, there may be exemplified the structure shown following formulae (2) to (5):

[Chem. 2]

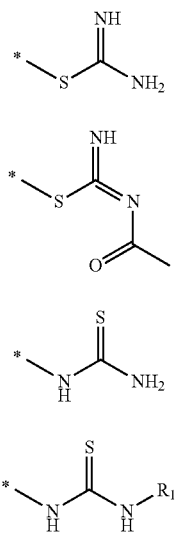

In the formulae (2) to (5), * represents a reaction site to bond to a graft side chain.

In the formula (5), R1 represents a carbon chain having 1 to 10 carbon atoms. Specifically, R1 may be a linear or branched alkyl group such as methyl group, ethyl group, propyl group, isopropyl group, butyl group, isobutyl group, sec-butyl group, a pentyl group, a hexyl group; a cycloalkyl group such as a cyclohexyl group and an adamantyl group; an aryl group such as a phenyl group, a naphthyl group. Further, R1 may be * as mentioned above.

According to the present invention, introduction of a graft chain having at least one structure selected from the group consisting of thiourea and isothiourea structures can be achieved (1) by using an unsaturated monomer having a thiourea or isothiourea group or both groups or (2) by using an unsaturated monomer that can be converted to a thiourea or isothiourea group (in the specification herein thiourea or isothiourea groups may be sometimes collectively referred to as thiourea group).

Examples of unsaturated monomers each having a thiourea group or an isothiourea group are not limited to a specific one, and may include the unsaturated monomer represented by the following formula (6). In the following formula (6), $R_2$ is hydrogen or methyl group. Further, X is a unit being capable of forming an ester bond or an amide bond with the adjacent carbonyl group. In view of chemical stability, $R_2$ is preferably methyl group. $R_3$ may be an alkylene chain having 2 to 10 carbon atoms and being optionally substituted, the alkylene chain having at least one structural group selected from the group consisting of thiourea structure and isothiourea structure at the end of the chain. The end structure of $R_3$ may contain any of the aforementioned formula (2) to (5), and in view of easiness of synthesis, $R_3$ may particularly preferably have the structure of formula (2) at the end.

[Chem. 3]

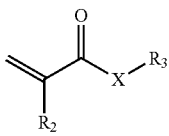

As the unsaturated monomer to be graft-polymerized, there may be used a monomer having a reactive group being convertible to a thiourea group or isothiourea group after graft polymerization, rather than a monomer having a thiourea or isothiourea group as described above. Examples of unsaturated monomers each having the reactive group include an unsaturated monomer having an epoxy group such as glycidyl(meth)acrylate; an unsaturated monomer having a halogenated alkyl group such as chloromethyl styrene and chloroethyl(meth)acrylate.

In order to convert such a reactive group into a thiourea group, for example, after graft polymerization of an unsaturated monomer having an epoxy group such as glycidyl (meth)acrylate, and/or an unsaturated monomer having a halogenated alkyl group such as chloromethyl styrene and chloroethyl(meth)acrylate to obtain a grafted material, the grafted material is reacted with an amine to introduce an amino group in the grafted material, followed by allowing the amino group to be reacted with isothiocyanate ester or thiocyanic acid or thiocyanate salt to introduce a thiourea group, or by allowing the amino group to be reacted with carbon disulfide to give a dithiocarbamic acid group and further reacted with an amine so as to introduce a thiourea group.

Examples of amines to be used may include, ammonia, methylamine, dimethylamine, ethylamine, diethylamine, ethylmethylamine, propylamine, diisopropylamine, methylpropylamine, methylisopropylamine, ethylpropylamine, ethylisopropylamine, tert-butylamine, hydroxylamine, aminomethanol, aminoethanol, aminopropanol, isopropanolamino, acetamido, methylcarbamate, ethylenediamine, trimethylenediamine, 2-methyl-1,3-propanediamine, propylenediamine, tetramethylenediamine, 3-methylaminopropylamine, 1,3-diamino-2-propanol, 2-methyl-1,2-propanediamine, N-methylethylenediamine, 1,4-butanediamine, 1,3-pentanediamine, 1,4-cyclohexanediamine, 1,3-cyclohexanediamine, trans-1,2-cyclohexanediamine, 2-methyl-1,5-pentanediamine, 1,5-pentanediamine, heptamethylenediamine, octamethylenediamine, nonamethylenediamine, decamethylenediamine, diethylenetriamine, triethylenetetramine, tetraethylenepentamine, pentamethylenehexamine, hexamethyleneheptamine, 2-aminobenzylamine, 3-aminobenzylamine, 4-aminobenzylamine, and others.

As the isothiocyanate ester used in the above, there may be mentioned, for example, methyl isothiocyanate, ethyl isothiocyanate, propyl isothiocyanate, butyl isothiocyanate, cyclohexyl isothiocyanate, phenyl isothiocyanate, adamantyl isothiocyanate, benzoyl isothiocyanate, benzyl isothiocyanate, phenylene diisothiocyanic acid, and the like. As the thiocyanic acid and a salt thereof, there may be mentioned thiocyanic acid, sodium thiocyanate, potassium thiocyanate, ammonium thiocyanate, iron thiocyanate, zinc thiocyanate, and the like.

For example, in order to convert the reactive group to isothiourea group, after graft polymerization of unsaturated monomers having epoxy groups such as glycidyl(meth) acrylate, and/or unsaturated monomers having halogenated alkyl groups such as chloromethyl styrene and chloroethyl (meth)acrylate so as to obtain a grafted material, the grafted material can be reacted with a thiourea compound such as thiourea and acetyithiourea to introduce an isothiourea group.

As mentioned above, two cases were described in order to introduce thiourea group or isothiourea group to the graft chain, i.e., (i) by using unsaturated monomers having thiourea or isothiourea groups, and (ii) by using unsaturated monomers that can be converted to thiourea or isothiourea groups. Among these two cases, as a method for introducing the thiourea or isothiourea groups in a large amount, there may be mentioned as a preferable way that after graft-polymerizing unsaturated monomers having alkyl halide groups or epoxy groups, these convertible groups are converted to thiourea or isothiourea groups. In addition, it is also preferable to introduce a thiourea or isothiourea group via glycidyl methacrylate and/or glycidyl acrylate in view of achieving moderate water resistance because the epoxy group and a hydroxyl group in the ethylene-vinyl alcohol copolymer can be partially cross-linked at the time introducing the epoxy group or the thiourea or isothiourea group. Further, at the introduction of the thiourea or isothiourea group, in consideration of stability, it is possible to introduce the thiourea or isothiourea group in the form of a salt with hydrochloric acid or nitric acid.

(3. Carboxyl Group (Iminodiacetic Acid Group))

Introduction of a graft chain having an iminodiacetic acid group, can be carried out by using an unsaturated monomer having a reactive group convertible to an iminodiacetic acid group, for example, an unsaturated monomer having an epoxy group such as glycidyl(meth)acrylate, and/or an unsaturated monomer having halogenated alkyl group such as chloromethyl styrene and chloroethyl(meth)acrylate. Conversion of the reactive group into an iminodiacetic acid group can be carried out by graft-polymerizing an unsaturated monomer having an epoxy group such as glycidyl (meth)acrylate, and/or an unsaturated monomer having a halogenated alkyl group such as chloromethyl styrene and chloroethyl(meth)acrylate to obtain a grafted material, followed by subjecting the grafted material to be reacted with an iminodiacetic acid or a salt thereof to introduce an iminodiacetic acid group.

(4. Ether Group or Amide Group)

As the specific examples of ether groups, there may be mentioned an oxyalkylene group, a furyl group or a tetrahydrofuryl group. As the oxyalkylene group, there may be exemplified ethylene glycol group, a polyethylene glycol group such as diethylene glycol group, triethylene glycol group, a propylene glycol group, a polypropylene glycol group such as dipropylene glycol group, tripropylene glycol group, a mono-etherified functional group thereof, and the like. As the furyl group, there may be exemplified 2-furyl group, 3-furyl group, and the like. As the tetrahydrofuryl group, there may be exemplified 2-tetrahydrofuryl group, 3-tetrahydrofuryl group, and the like. The tetrahydrofuryl group and furyl group may be partly substituted. The specific examples of the amide groups may include dimethyl amide group, diethylamide group, methylethylamide group, pyrrolidone group, and the like.

Introduction of an amide group or an ether group can be carried out (1) by using an unsaturated monomer having a halogenated alkyl group such as chloromethyl styrene and chloroethyl(meth)acrylate or an unsaturated monomer having an epoxy group such as glycidyl methacrylate. These unsaturated monomers are introduced to a base substrate in advance by a method of graft copolymerization, followed by allowing the base substrate to be reacted with the compound having a functional group described above so as to introduce a graft chain having an ether group or an amido group. Alternatively, introduction of an ether group or an amide group can be carried out (2) by starting polymerization of unsaturated monomers having the functional groups as described above from the substrate polymer (backbone polymer) to produce a graft polymer.

Where applying the method described above in (1), as the compound to be reacted, there may be used a compound, for example, an oxyalkylene group-containing alcohol such as triethylene glycol monomethyl ether, diethylene glycol monobutyl ether, triethylene glycol monobutyl ether; furfural; tetrahydrofurfural; 1-(3-hydroxypropyl)-2-pyrrolidinone; and others.

Where applying the method (2) above, as the unsaturated monomer to be reacted, there may be used, for example, a (meth)acrylate type or (meth)acrylamide type monomer having continuous oxyalkylene structure such as 2-methoxyethyl methacrylate, 2-ethoxyethyl methacrylate, diethylene glycol monomethyl ether methacrylate, a polyethylene glycol methacrylate, a polypropylene glycol methacrylate, a polyethylene-polypropylene glycol methacrylate; furfuryl methacrylate; tetrahydrofurfuryl methacrylate; a tertiary amide-type monomer such as dimethylacrylamide, diethylacrylamide, dimethylmethacrylamide, diethylmethacrylamide, N-vinyl pyrrolidone, and others.

(5. Other Functional Group)

Where introducing a metal-adsorbing (adsorptive) functional group other than those mentioned above into a graft chain, introduction can be achieved by graft polymerizing monomers having metal-adsorptive functional groups (metal-adsorbing or metal-binding monomers) directly or by using monomers having reactive groups convertible to metal adsorptive functional groups.

Examples of metal adsorbing monomers include a monomer having a carboxyl group such as (meth)acrylic acid and fumaric acid; a monomer having a phosphoric acid group such as (2-methacryloyloxyethyl) acid phosphate; a monomer having a sulfonyl group such as 4-sulfonyl styrene and 2-acrylamido-2-methyl propane sulfonic acid, and a salt thereof; a monomer having a thiol group such as thiovinyl acetate and 1-acetylthio-2-hydroxy-3-butene; a monomer having a nitrile group such as acrylonitrile; and others.

Where using a monomer having a reactive group convertible to a metal adsorbing functional group, introduction of a metal adsorbing group can be carried out by graft polymerizing an acrylonitrile to form a graft chain, followed by allowing the nitrile group to be reacted with hydroxylamine for converting the nitrile group to an amideoxim group. Alternatively, introduction of a metal or semi-metal adsorbing group can be carried out by graft polymerizing glycidyl methacrylate to form a graft chain, followed by allowing the epoxy group to be reacted with methyl glucamine. Further, introduction of metal absorbing group is also possible by allowing the epoxy group to be reacted with (aminomethyl) phosphonic acid or the like.

(Porous Graft Copolymer Particle)

The porous graft copolymer particle according to the present invention has pores formed at least on the surface, and may not have pores inside of the particle structure. The pores formed on the surface may have an average pore diameter of about from 0.01 μm to 50 μm, preferably about from 0.05 μm to 20 μm, and more preferably about from 0.2 μm to 10 μm. The porous graft copolymer particle having an average pore diameter of less than 0.01 μm may have a possibility that the porous graft copolymer particle may not have the sufficient amount of functional groups. The porous graft copolymer particle having an average pore diameter of larger than 50 µm may have a possibility that the porous graft copolymer particle may have reduced mechanical strength, resulting in breakage of the particle used as a reactive substrate. The average pore diameter of the pores thereof is a value measured by the method described in Examples below.

(Particles)

The particle size of the graft copolymer particles according to the present invention can be adjusted by appropriately crushing, pulverizing or others. The particle diameter is preferably from 10 µm to 2000 µm, further preferably from 30 µm to 1500 µm, and most preferably from 40 µm to 1000 µm. Where the particle diameter is less than 10 µm, in some cases handleability of the particles becomes too difficult because of easy scattering of fine particles. Where the particle diameter is more than 2000 µm, there is a possibility that the adsorption performance of the metals cannot be obtained in a sufficient level.

(Production Method of Porous Graft Copolymer Particle)

The method for producing a porous graft copolymer particle of the present invention is not limited to a specific one. One of the preferable production methods is described below.

The method comprises the following four steps:

Step I: A polymer A having excellent moldability (at least one resin selected from the group consisting of an olefin resin, a water-insoluble modified polyvinyl alcohol resin, an amide resin, a cellulosic resin, a chitosan resin and a (meth)acrylate resin) is melt-kneaded with another polymer B other than the polymer A to produce a compound material (compound mixture) obtained by melt-kneading, and then cooling to be solidified so as to have a predetermined shape.

Step II: The polymer B is extracted and removed from the compound material (compound mixture) to obtain a porous material of the polymer A.

Step III: The cooled compound material obtained after step I or the porous material obtained after step II is granulated by cutting, crushing, pulverizing, or the like to obtain a particle having a predetermined particle size of the compound material or the porous material of the polymer A.

Step IV: The porous polymer particle is graft-polymerized with monomers having a functional group(s) to obtain a porous polymer particle having a graft chain, the chain having a functional group(s) introduced thereinto.

According to the present invention, the phrase "a compound material obtained by melt-kneading and then cooling to be solidified" refers to that the molten material is cooled to be solidified without using a coagulating bath.

(Polymer B)

The polymer B used in the present invention is not particularly limited to a specific one, and any of generally known polymers can be used. Preferable polymers may include one that can be melt-blended with polymer A, and for example, a starch; a gelatin; a cellulose derivative; a water-soluble amine-based polymer such as a polyvinyl amine, a polyallylamine; a polyacrylic acid; a polyacrylamide such as a polyisopropylacrylamide; a polyvinylpyrrolidone; a polyvinyl alcohol; an ether-type polymer such as a polyethylene glycol and a polypropylene glycol; a styrenic resin; a phenolic resin; an acetal-type resin such as a polyvinyl butyral; a polycarbonate; and the like. In the extent that the resin is different from the polymer A, an olefin resin; an amide resin; a (meth)acrylate resin; or the like can be used as the polymer B.

The mass ratio of the polymer A and polymer B may be determined appropriately, for example, polymer A: polymer B of about 99.9:0.1 to 20:80, and preferably about 99.9:0.1 to 30:70 in accordance with the desired degree of the porosity, or others.

(Step I)

The method of melt-kneading a polymer A and a polymer B other than the polymer A is not particularly limited to a specific one, and may be carried out by using a known kneader and/or mixer such as a single-screw extruder, a twin-screw extruder, a brabender, a kneader, and the like. Thus obtained melt-kneaded mixture comprising the polymer A and the polymer B may be formed into a strand-like structure and cooled to be solidified.

(Step II)

The cooled and solidified mixture is subjected to extraction of the polymer B with a solvent which is a good solvent for polymer B while a poor solvent for the polymer A, to obtain a porous body of polymer A.

The extraction solvent used in the present invention is not particularly limited to a specific one, and may be a good solvent for the polymer B and a poor solvent for the polymer A, and preferably a solvent unable to react with the polymer A as well as the polymer B. The solvent may be used singly or in combination with two or more. As the solvent, there may be mentioned, for example water, methanol, ethanol, 1-propanol, isopropanol, 1-butanol, 2-butanol, tetrahydrofuran, 1,4-dioxane, diethyl ether, chloroform, methylene chloride, methyl acetate, ethyl acetate, acetonitrile, acetone, dimethylformamide, dimethyl sulfoxide, benzene, toluene, xylene, hexane, heptane, or the like.

In particular, where the polymer B is a hydrophilic polymer, it is preferable use alcohol or water as a solvent. The temperature of the solvent at the time of extraction is preferably from 40° C. to 120° C., and more preferably from 50° C. to 100° C.

(Step III)

After the step I (melt-kneaded and solidified mixture is obtained) or the step II (polymer having a porous structure is obtained), the mixture or the porous material of the polymer A is granulated by cutting or crushing or pulverizing (Step IV)

The porous particle of the polymer A obtained in the step III is graft-polymerized with polymerizable monomers having functional groups so as to introduce graft chains to the polymer A.

As the method of introducing a graft chain, various known methods are possible. There may be mentioned, for example, a method of introducing a graft chain by radical polymerization in the presence of a polymerization initiator; a method of irradiating ionizing radiation to particles to generate radicals, followed by introducing the graft chain; and others. Among them, from the viewpoint of high introduction ratio of the graft chain, a method irradiating ionizing radiation to introduce a graft chain is preferable. In particular, use of a porous substrate can achieve efficient introduction of functional groups by graft polymerization.

As the ionizing radiation, there may be mentioned α-rays, β-rays, γ rays, accelerated electron beam, and ultraviolet rays or the like, and accelerated electron beam and γ rays are preferred in practice.

As a method of graft-polymerizing unsaturated monomers to the substrate of the porous resin particle using ionizing radiation, there may be mentioned either a mixed irradiation method for irradiating a substrate in the presence of unsaturated monomers, or a pre-irradiation method for irradiating only the substrate in advance and then bringing the substrate into contact with unsaturated monomers. Although both methods are possible, the latter pre-irradiation method has advantageous characteristics that can reduce side reaction other than the graft polymerization.

As the method of bringing a substrate into contact with unsaturated monomers, there may be mentioned a liquid phase graft polymerization method bringing the substrate direct contact into unsaturated monomers in a liquid state or an unsaturated monomer solution; and a vapor phase graft polymerization method bringing the substrate direct contact into unsaturated monomers in a vaporized state or unsaturated monomer gas. These methods can be selected depending on the purpose.

As the method of introducing a graft chain, various known methods are possible. There may be mentioned, for example, a method of introducing a graft chain by radical polymerization in the presence of a polymerization initiator; a method of irradiating ionizing radiation to particles to generate radicals, followed by introducing the graft chain, and others. Among them, from the viewpoint of high introduction ratio of the graft chain, a method by irradiating ionizing radiation to introduce a graft chain is preferable. In particular, use of a porous substrate can achieve efficient introduction of functional groups by graft polymerization.

The dose of irradiating ionizing radiation is not limited to a specific one, and may be preferably in a range from 5 to 230 kGy, and more preferably from 10 to 190 kGy, and still more preferably from 15 to 140 kGy. The range from 20 to 100 kGy is most preferred. Where irradiation dose is less than 5 kGy, there is a possibility that the graft ratio may be reduced because of too low dose, resulting in failing to obtain the desired metal ion adsorption capacity. Where irradiation dose is more than 230 kGy, there is a concern such that processing may cost too much, or that the resin may be degraded during irradiation.

Introduction of a graft chain having an adsorptive functional group can be carried out by graft-polymerizing unsaturated monomers having adsorptive functional groups to form a graft chain(s), or by graft-polymerizing unsaturated monomers having reactive groups using ionizing radiation to form a graft chain(s), followed by converting the reactive groups to adsorptive functional groups.

Where carrying out the graft polymerization for introducing the graft chain having an adsorptive functional group, in addition to unsaturated monomers having functional groups, unsaturated monomers other than the functional group-containing monomers can be used within the range that the performance of the unsaturated monomer having a functional group is not impaired. For example, in order to suppress swelling of the graft chain, a polyfunctional unsaturated monomer can be used such as divinylbenzene, ethylene glycol di(meth)acrylate, triethylene glycol di(meth) acrylate, tetraethylene glycol di(meth)acrylate, 1-(acryloyloxy)-3-(methacryloyloxy)-2-propanol, bismethylene acrylamide, and others.

From the viewpoint of stability of the activated species generated during and/or after irradiation of ionizing radiation to the substrate, it is effective to handle the substrate at a low temperature. In the case of radiation-induced graft polymerization, the solvent temperature at the beginning of the polymerization may be preferably 20° C. or lower, and more preferably 10° C. or lower. Where the temperature is higher than 20° C., there is a possibility that the introduced amount of the unsaturated monomers is not stable, or that it may not be secured a sufficient amount of introduction of the unsaturated monomers. It should be noted that if the substrate is an ethylene-vinyl alcohol copolymer, it is not necessary to reduce the solvent temperature as low as the above at the beginning of the polymerization. The details will be described later.

(Graft Ratio)

According to the graft polymerization, the graft chain is formed on the porous polymer particles A from polymerizable monomers having functional groups described above.

The amount of unsaturated monomers to be introduced by graft polymerization (graft ratio) is not particularly limited to a specific one. The graft ratio may be, based on 100 parts by mass of the porous polymer A particles, preferably 30 to 900 parts by mass (30 to 900%), more preferably 90 to 800 parts by mass (90 to 800%), still more preferably 120 to 700 parts by mass (120 to 700%), particularly preferably 150 to 600 parts by mass (150 to 600%). If the graft ratio is less than 30 parts by mass, the adsorption performance of the metal or the like may be insufficient in many cases. If the graft ratio is more than 900 parts by mass, it is difficult to synthesize in general.

Within the extent that it does not inhibit the effect of the present invention, the graft copolymer particle according to the present invention may contain an additive(s) such as a cross-linking agent, inorganic fine particles, light stabilizers, an antioxidant, and others.

(Porous Ethylene-Vinyl Alcohol Copolymer Particle)

A method for obtaining porous particles of ethylene-vinyl alcohol copolymer (hereinafter, sometimes abbreviated as EVOH) preferably used in the present invention will be described below.

In the step I, an ethylene-vinyl alcohol copolymer is preferably mixed with a water-soluble polymer by melt-kneading to obtain a mixture, and then, in the step II, the water-soluble polymer in the mixture is preferably removed by extraction with an aqueous solvent to form a porous material.

The water-soluble polymer used in the present invention is not particularly limited to a specific one as long as it can be melt-mixed with ethylene-vinyl alcohol copolymers, and includes generally known water soluble polymer. Examples of the water-soluble polymers include a starch; a gelatin; a cellulose derivative; a water-soluble amine-based polymer such as a polyvinyl amine, a polyallylamine; a polyacrylic acid; a polyacrylamide such as a polyisopropylacrylamide; a polyvinylpyrrolidone; a polyvinyl alcohol; and the like. Among them, the polyvinyl alcohol is particularly preferred because the polyvinyl alcohol is easy to be melt-kneaded with ethylene-vinyl alcohol copolymer as well as easy control of the pore size.

The viscosity average polymerization degree (measured according to JIS K6726) of the polyvinyl alcohol used in the present invention is not particularly limited to a specific one, and is preferably from 100 to 10,000, more preferably from 200 to 7,000, and more preferably from 300 to 5,000. Where the viscosity average degree of polymerization is outside the above range, there is a possibility that the surface area of the porous body obtained may be reduced.

The saponification degree of the polyvinyl alcohol used in the present invention is not particularly limited to a specific one, and is preferably 50% by mole or higher, more preferably from 60 to 98% by mole, and particularly preferably from 70 to 95% by mole. Where the saponification degree is lower than 50% by mole, water solubility decreases, and may lead to poor extraction of the polyvinyl alcohol with hot water after molding. Where the saponification degree is higher than 98% by mole, it may be difficult to carry out melt-blend.

The mass ratio of ethylene-vinyl alcohol copolymer relative to water-soluble polymer may be selected appropriately depending on the degree of the porous in need, and is, for example, ethylene-vinyl alcohol copolymer: water-soluble polymer may be about from 99.9:0.1 to 20:80, and preferably about from 99.9:0.1 to 30:70.

As the extracting solvent, any solvent which does not dissolve the ethylene-vinyl alcohol copolymer while dissolve the water-soluble polymer can be used. Examples of extracting solvent to be used may include water, various organic solvents, a mixture of water and an organic solvent(s). From the viewpoint of utilizing the water-soluble polymer, preferable solvent includes water, especially hot water. The temperature of the hot water is preferably from 40° C. to 120° C., and more preferably from 50° C. to 100° C.

The porous ethylene-vinyl alcohol copolymer obtained by removing the water-soluble polymer is preferably formed into particles by crushing or pulverizing or others.

The porous ethylene-vinyl alcohol copolymer particle obtained by removing the water-soluble polymer as described above may have an average pore diameter about from 0.01 μm to 50 μm, preferably about from 0.05 μm to 20 μm, and more preferably about from 0.2 μm to 10 μm in the same way as other polymer particles. In the case of ethylene-vinyl alcohol copolymer, the average pore diameter may be even more preferably about from 0.1 μm to 7 μm, and further preferably about from 0.2 μm to 7 μm. A sufficient amount of adsorption can be obtained in the particles having a pore diameter within this range.

(Graft Polymerization to Ethylene-Vinyl Alcohol Copolymer)

Where the ethylene vinyl alcohol copolymer is used as a substrate for radiation-induced graft polymerization, radicals produced in the ethylene-vinyl alcohol copolymer by irradiation has a stability. Even after leaving the irradiated ethylene-vinyl alcohol copolymer from 1 to 2 hours in air, followed by carrying out graft polymerization by bringing unsaturated monomers into contact with the ethylene-vinyl alcohol copolymer, graft polymerization performance of the ethylene-vinyl alcohol copolymer is not changed substantially. Therefore, introduction of graft chains into the ethylene-vinyl alcohol copolymer by graft polymerization is easier in comparison with other polymers.

(Application of Porous Graft Copolymer Particles)

The graft copolymer particles of the present invention can be used in wide range of applications such as molded materials, coatings, adhesives, various adsorbents, and others. Since the graft copolymer particle has an excellent metal-adsorptive ability, particularly preferred usage of the graft copolymer particle is a metal adsorbent.

(Metal Recovery Method)

The adsorbent of the present invention can recover various metals (in particular platinum group metals) and semi-metals with high efficiency and simple manipulation. The recovering method is not particularly limited to a specific one as long as the adsorbent of the present invention is used. For example, the metal recovery process may comprise bringing the adsorbent of the present invention into contact with a liquid containing a metal of interest so as to make the metal adsorbed into the adsorbent. In the process, if necessary, the adsorbent may be stirred in the liquid.

The metals to be recovered in the adsorbent of the present invention are not limited to a specific one, and may be platinum group metals (ruthenium, rhodium, palladium, osmium, iridium, and platinum), gold, silver, copper, nickel, chromium, vanadium, cobalt, lead, zinc, mercury, cadmium and the like. Further, as the semi-metals to be recovered, there may be mentioned boron, arsenic, germanium, selenium, antimony and the like. Depending on the species of metals and semi-metals to be adsorbed, a functional group to be introduced into the graft chains is appropriately selected.

In the recovery process, it is possible to adsorb metals with a very high efficiency. The adsorption amount of metal may be, for example, 20 mg/g or higher, preferably 50 mg/g or higher, and more preferably 100 mg/g or higher.

The adsorption amount is a value measured by the method described in Examples below.

EXAMPLES

Hereinafter, the present invention is described in more detail by way of Examples, but the present invention is not intended to be limited to these examples. Unless otherwise specified, in Examples and Comparative Examples, "%" and "parts" respectively represent "% by mass" and "parts by mass".

[Calculation of the Average Pore Diameter]

After vacuum drying obtained adsorbent particles at 40° C. for 12 hours, the particle surface of the obtained adsorbent was observed by using a scanning electron microscope. After arbitrarily selecting 50 pores formed on the surface, each of the selected pores was measured for the major axis (larger pore size dimention) thereof. The average major axis of 50 pores was divided to obtain an average value and determined as the average pore diameter. Notwithstanding the preceding sentence, the measured value of 1 nm or less was omitted because of the difficulty in distinction from scratches, and adhering substances, etc.

[Graft Ratio]

Graft ratio was calculated according to the formula shown below:

Graft ratio [(%)w/w]=100×(weight of graft chain obtained)/(weight of substrate)

[Amount of Functional Group]

Examples A-1 to A-10, B-1 to B-4, F-2, F-5, G-1 to G-4 and Comparative Example A-4

The change in mass before and after performing the functional group-introducing reaction is determined as W. The amount of functional groups was calculated according to the formula shown below:

Amount of functional groups [mmol/g]=(number of nitrogen atoms per molecule [No.]×$W$ [g]/molecular weight of reaction substrate [g/mol])/(resin particle mass after the reaction)×1000

Examples C-1 to C-10, F-4 and Comparative Example F-3

The change in mass before and after performing the functional group-introducing reaction is determined as W. The amount of functional groups was calculated according to the formula shown below:

Amount of functional groups [mmol/g]=(number of sulfur atoms per molecule [No.]×$W$ [g]/molecular weight of reaction substrate [g/mol])/(resin particle mass after the reaction)×1000

Examples D-1 to D-5

The change in mass before and after performing the iminodiacetic acid group-introducing reaction is determined as W. The amount of functional groups was calculated according to the formula shown below:

Amount of functional groups [mmol/g]=($W$ [g]/molecular weight of reaction substrate [g/mol])/(resin particle mass after the reaction)×1000

Since iminodiacetic acid group has two carboxyl groups in one molecule, the amount of functional groups as the carboxyl group is calculated by the formula shown below:

Amount of functional groups [mmol/g]=($W$ [g]/molecular weight of reaction substrate [g/mol])/(resin particle mass after the reaction)×1000×2

Examples E-1 to E-6, F-1, F-3 and Comparative Examples E-1 to E-3, F-1 to F-2

The change in mass before and after performing the iminodiacetic acid group-introducing reaction is determined as W. The amount of functional groups was calculated according to the formula shown below:

Amount of functional groups [mmol/g]=(number of functional groups per molecule [No.]×$W$ [g]/molecular weight of reaction substrate [g/mol])/(resin particle mass after the reaction)×1000

[Metal Adsorption Amount, Metal Adsorption Rate and Elution Rate]

Examples A-1 to A-10 and Comparative Examples A-1 to A-7

Into 200 mL of a 1 N hydrochloric acid solution having a metal concentration of 100 mg/L, 50 mg of an adsorbent is added, and stirred for 60 min at 25° C. Thereafter, 1 mL of the solution is collected and volumed up to 50 mL. The metal concentration of the resultant is measured by using an ICP emission spectrometer (Nippon Jarrell Ash, Ltd., IRIS-AP) and defined as C (mg/L). The metal adsorption amount is calculated by the following formula:

Metal adsorption amount per 1 g of sample(mg/g)=(100−50×$C$)/0.25

The sample after measuring adsorption amount is taken off from the solution and blotted dry to remove the adhered solution. The dried sample is then added into 20 mL of an aqueous thiourea solution at 25° C. for 10 minutes to elute the metal. Thereafter, 1 mL of the elute solution is collected and volumed up to 50 mL. The metal concentration of the resultant is measured by using an ICP emission spectrometer and defined as D (mg/L). The metal elution rate is calculated by the following formula.

Elution rate=$D$/(20−10×$C$)×100(%)

Examples B-1 to B-4 and Comparative Examples B-1 to B-2

Into 100 mL of a 0.2 N nitric acid solution having a palladium ion concentration of 50 mg/L, 50 mg of an adsorbent is added, and stirred for 24 hours at 25° C. Thereafter, 1 mL of the solution is collected and volumed up to 25 mL. The metal concentration of the resultant is measured by using an ICP emission spectrometer (Nippon Jarrell Ash, Ltd., IRIS-AP) and defined as C (mg/L). The metal adsorption amount is calculated by the following formula:

Metal adsorption amount per 1 g of sample (mg/g)=100−50×$C$

Examples C-1 to C-13 and Comparative Examples C-1 to C-3

Into 25 mL of a 0.2 N nitric acid solution having a target metal ion concentration of 200 mg/L, 50 mg of an adsorbent is added, and stirred for 24 hours at 23° C. Thereafter, 1 mL of the solution is collected and volumed up to 100 mL. The metal concentration of the resultant is measured by using an ICP emission spectrometer (Nippon Jarrell Ash, Ltd., IRIS-AP) and defined as C (mg/L). The metal adsorption amount is calculated by the following formula:

Metal adsorption amount per 1 g of sample(mg/g)=(2−$C$)×50

Examples D-1 to D-5 and Comparative Examples D-1 to D-2

Into 150 mL of a 0.001 N sulfuric acid solution having a target metal ion concentration of 30 mg/L, 50 mg of an adsorbent is added, and stirred for 60 min at 23° C. Thereafter, 1 mL of the solution is collected and volumed up to 50 mL. The metal concentration of the resultant is measured by using an ICP emission spectrometer (Nippon Jarrell Ash, Ltd., IRIS-AP) and defined as C (mg/L). The metal adsorption amount is calculated by the following formula:

Metal adsorption amount per 1 g of sample(mg/g)=(30−$C$×50)/30×100

Examples E-1 to E-6 and Comparative Example E-1 to E-3

Into 20 mL of a 5 N hydrochloric acid solution having a target metal ion concentration of 1 mmol/L, 50 mg of an adsorbent is added, and stirred for 24 hours at 23° C. Thereafter, 1 mL of the solution is collected and volumed up to 50 mL. The metal concentration of the resultant is measured by using an ICP emission spectrometer (Nippon Jarrell Ash, Ltd., IRIS-AP) and defined as C (mg/L). The metal adsorption amount is calculated by the following formula:

Metal adsorption amount per 1 $g$ of sample(mg/g)=(1−$C$×50)×100(%)

The sample after measuring adsorption amount is taken off from the solution and blotted dry to remove the adhered solution. The sample is then added into 20 mL of deionized water at 80° C. 3 hours to elute the metal. Thereafter, 1 mL of the elute solution is collected and volumed up to 50 mL. The metal concentration of the resultant is measured by using an ICP emission spectrometer and defined as D (mg/L). The metal elution rate is calculated by the following formula.

Elution rate=$D$/(3.94−197×$C$)×100(%)

Examples F-1 to F-3, F-5 and Comparative Examples F-1 and F-2

Into 200 mL of a 1 N hydrochloric acid solution having a target metal ion concentration of 100 mg/L, 50 mg of an adsorbent is added, and stirred for 60 minutes at 25° C. Thereafter, 1 mL of the solution is collected and volumed up to 50 mL. The metal concentration of the resultant is measured by using an ICP emission spectrometer (Nippon Jarrell Ash, Ltd., IRIS-AP) and defined as C (mg/L). The metal adsorption amount is calculated by the following formula:

Metal adsorption amount per 1 g of sample
(mg/g)=100−C×50(%)

Example F-4 and Comparative Example F-3

Into 25 mL of 0.2 N nitric acid solution having a target metal ion concentration of 200 mg/L, 50 mg of an adsorbent is added, and stirred for 24 hours at 23° C. Thereafter, 1 mL of the solution is collected and volumed up to 50 mL The metal concentration of the resultant is measured by using an ICP emission spectrometer (Nippon Jarrell Ash, Ltd., IRIS-AP) and defined as C (mg/L). The metal adsorption amount is calculated by the following formula:

Metal adsorption amount per 1 g of sample
(mg/g)=100−C×50(%)

Examples G-1 to G-4

Into 40 mL of an aqueous sodium hydroxide solution (pH=8) having a boron concentration of 100 mg/L, 100 mg of an adsorbent is added, and stirred for 24 hours at 25° C. Thereafter, the solution is collected to measure the metal concentration of the resultant by using an ICP emission spectrometer (Nippon Jarrell Ash, Ltd., IRIS-AP) and defined as C (mg/L). The metal adsorption amount is calculated by the following formula:

Boron adsorption amount per 1 g of sample
(mg/g)=40−C×0.4

Example G-5

Into 100 mL of a nitric acid solution (pH=3) having an arsenic concentration of 20 mg/L, 50 mg of an adsorbent is added, and stirred for 24 hours at 25° C. Thereafter, the metal concentration of the solution is measured by an atomic absorption spectrometer (Hitachi, Ltd., Z-5000) and defined as C (mg/L). The metal adsorption amount is calculated by the following formula:

Arsenic adsorption amount per 1 g of sample
(mg/g)=40−C×2

(Examples of Introducing a Graft Chain having an Aliphatic Amino Group to EVOH)

Example A-1

Using a kneader (Labo Plastmill), 90 parts by mass of an ethylene-vinyl alcohol (manufactured by Kuraray Co., Ltd., F101) and 10 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 μm to 425 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.60 μm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 281%. Further, the graft particles were immersed in a 53% by mass solution of diethylenetriamine in isopropanol controlled to 80° C. to be allowed to react for 4 hours. After the reaction, the particles were washed with methanol and dried to obtain a water resistant metal ion adsorbent comprising a target amino group-grafted ethylene-vinyl alcohol copolymer. Thus obtained metal ion adsorbent particles were classified using a sieve to obtain particles having a particle size from 425 μm to 710 μm, and then evaluated the amount of adsorption and elution rate of Pd. The results are shown in Table 1. The adsorbent had an average pore diameter of 0.51 μm and a functional group content of 9.6 mmol/g.

Example A-2

Using a kneader (Labo Plastmill), 50 parts by mass of an ethylene-vinyl alcohol copolymer (manufactured by Kuraray Co., Ltd., E105) and 50 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 μm to 425 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 1.56 μm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 216%. Further, the graft particles were immersed in a 53% by mass solution of diethylenetriamine in isopropanol controlled to 80° C. to be allowed to react for 4 hours. After the reaction, the particles were washed with methanol and dried to obtain a water resistant metal ion adsorbent comprising a target amino group-grafted ethylene-vinyl alcohol copolymer. Thus obtained metal ion adsorbent particles were classified using a sieve to obtain particles having a particle size from 425 μm to 710 μm, and then evaluated the amount of adsorption and elution rate of Pd. The results are shown in Table 1. The adsorbent had an average pore diameter of 1.45 μm and a functional group content of 8.8 mmol/g.

Example A-3

Using a kneader (Labo Plastmill), 60 parts by mass of an ethylene-vinyl alcohol copolymer (manufactured by Kuraray Co., Ltd., L104) and 40 parts by mass of a vinyl alcohol polymer (manufactured by Kuraray Co., Ltd., PVA217), both commercially available, were melt-kneaded for 3 minutes at 210° C., followed by cooling and solidifying the molten mixture, and pulverizing and sieving the solidified mixture to produce particles having a particle size from 212 μm to 425 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.83 μm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 366%. Further, the graft particles were immersed in a 40% by mass solution of ethylenediamine in isopropanol controlled to 80° C. to be allowed to react for 4 hours. After the reaction, the particles were washed with methanol and dried to obtain a water resistant metal ion adsorbent comprising a target amino group-grafted ethylene-vinyl alcohol copolymer. Thus obtained metal ion adsorbent particles were classified using a sieve to obtain particles having a particle size from 425 μm to 710 μm, and then evaluated the amount of adsorption and elution rate of Pd. The results are shown in Table 1. The adsorbent had an average pore diameter of 0.71 μm and a functional group content of 7.7 mmol/g.

Example A-4

Using a kneader (Labo Plastmill), 70 parts by mass of an ethylene-vinyl alcohol copolymer (manufactured by Kuraray Co., Ltd., G 156) and 30 parts by mass of a vinyl alcohol polymer (manufactured by Kuraray Co., Ltd., PVA403), both commercially available, were melt-kneaded for 3 minutes at 210° C., followed by cooling and solidifying the molten mixture, and pulverizing and sieving the solidified mixture to produce particles having a particle size from 212 μm to 425 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.95 μm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 174%. Further, the graft particles were immersed in a 53% by mass solution of diethylenetriamine in isopropanol controlled to 80° C. to be allowed to react for 4 hours. After the reaction, the particles were washed with methanol and dried to obtain a water resistant metal ion adsorbent comprising a target amino group-grafted ethylene-vinyl alcohol copolymer. Thus obtained metal ion adsorbent particles were classified using a sieve to obtain particles having a particle size from 212 μm to 500 μm, and then evaluated the amount of adsorption and elution rate of Pd. The results are shown in Table 1. The adsorbent had an average pore diameter of 0.84 μm and a functional group content of 8.5 mmol/g.

Example A-5

Using a kneader (Labo Plastmill), 99 parts by mass of an ethylene-vinyl alcohol copolymer (manufactured by Kuraray Co., Ltd., F101) and 1 part by weight of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 μm to 425 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.15 μm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 278%. Further, the graft particles were immersed in a 40% by mass solution of ethylenediamine in isopropanol controlled to 80° C. to be allowed to react for 4 hours. After the reaction, the particles were washed with methanol and dried to obtain a water resistant metal ion adsorbent comprising a target amino group-grafted ethylene-vinyl alcohol copolymer. Thus obtained metal ion adsorbent particles were classified using a sieve to obtain particles having a particle size from 212 μm to 500 μm, and then evaluated the amount of adsorption and elution rate of Pd. The results are shown in Table 1. The adsorbent had an average pore diameter of 0.10 μm and a functional group content of 7.2 mmol/g.

Example A-6

Using a kneader (Labo Plastmill), 40 parts by mass of an ethylene-vinyl alcohol copolymer (manufactured by Kuraray Co., Ltd., F101) and 60 parts by mass of a vinyl alcohol polymer (manufactured by Kuraray Co., Ltd., PVA203), both commercially available, were melt-kneaded for 3 minutes at 210° C., followed by cooling and solidifying the molten mixture, and pulverizing and sieving the solidified mixture to produce particles having a particle size from 425 μm to 710 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 3.46 μm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 303%. Further, the graft particles were immersed in a 40% by mass solution of ethylenediamine in isopropanol controlled to 80° C. to be allowed to react for 4 hours. After the reaction, the particles were washed with methanol and dried to obtain a water resistant metal ion adsorbent comprising a target amino group-grafted ethylene-vinyl alcohol copolymer. Thus obtained metal ion adsorbent particles were classified using a sieve to obtain particles having a particle size from 1,000 μm to 1,400 μm, and then evaluated the amount of adsorption and elution rate of Pd. The results are shown in Table 1. The adsorbent had an average pore diameter of 2.85 μm and a functional group content of 7.4 mmol/g.

Example A-7

After irradiation of γ rays at 30 kGy to the porous ethylene-vinyl alcohol copolymer particles of Example A-1, the irradiated materials were allowed to stand in air for one hour, then immersed in a 10% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 132%. Further, the graft particles were immersed in a 53% by mass solution of diethylenetriamine in isopropanol controlled to 80° C. to be allowed to react for 4 hours. After the reaction, the particles were washed with methanol and dried to obtain a water resistant metal ion adsorbent comprising a target amino group-grafted ethylene-vinyl alcohol copolymer. Thus obtained metal ion adsorbent particles were classified using a sieve to obtain particles having a particle size from 425 μm to 710 μm, and then evaluated the amount of adsorption and elution rate of Pd. The results are shown in Table 1. The adsorbent had an average pore diameter of 0.58 μm and a functional group content of 6.2 mmol/g.

Example A-8

The graft copolymer particles (graft ratio: 281%) were immersed in a 49% by mass solution of N,N'-dimethylethylenediamine in isopropanol controlled to 80° C. to be allowed to react for 4 hours. After the reaction, the particles were washed with methanol and dried to obtain a water resistant metal ion adsorbent comprising a target amino group-grafted ethylene-vinyl alcohol copolymer. Thus obtained metal ion adsorbent particles were classified using a sieve to obtain particles having a particle size from 425 μm to 710 μm, and then evaluated the amount of adsorption and elution rate of Pd. The results are shown in Table 1. The adsorbent had an average pore diameter of 0.46 μm and a functional group content of 6.5 mmol/g.

Example A-9

The solidified molten mixture of ethylene-vinyl alcohol copolymer and vinyl alcohol polymer obtained in Example A-1 was pulverized and sieved to produce particles having a particle size from 150 μm to 300 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.60 μm. After irradiation of γ rays at 60 kGy to the porous particles, the irradiated materials were allowed to stand in air for one hour, then immersed in a 60% by mass solution of glycidyl methacrylate in isopropanol purged with nitrogen at 80° C. to carry out graft polymerization for 120 minutes with stirring to obtain graft particles. The graft particles were washed with methanol and dried. The graft ratio of the dried particles was evaluated as 389%. Further, the graft particles were immersed in a 65% by mass solution of N-(2-aminoethyl)piperadine in isopropanol controlled to 80° C. to be allowed to react for 3 hours. After the reaction, the particles were washed with methanol and dried to obtain a water resistant metal ion adsorbent comprising a target amino group-grafted ethylene-vinyl alcohol copolymer. Thus obtained metal ion adsorbent particles were classified using a sieve to obtain particles having a particle size from 212 μm to 425 μm, and then evaluated the amount of adsorption and elution rate of Pd. The results are shown in Table 1. The adsorbent had an average pore diameter of 0.49 μm and a functional group content of 9.1 mmol/g.

Example A-10

Using a kneader (Labo Plastmill), 60 parts by mass of an ethylene-vinyl alcohol copolymer (manufactured by Kuraray Co., Ltd., F101) and 40 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 106 μm to 212 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 1.37 μm. After irradiation of γ rays at 30 kGy to the porous particles, the irradiated materials were allowed to stand in air for one hour, then immersed in a 30% by mass solution of glycidyl methacrylate in isopropanol purged with nitrogen at 80° C. to carry out graft polymerization for 120 minutes with stirring to obtain graft particles. The graft particles were washed with methanol and dried. The graft ratio of the dried particles was evaluated as 364%. Further, the graft particles were immersed in a 50% by mass solution of polyethyleneimine (Nippon Shokubai Co., Ltd. EPOMIN SP-200) in isopropanol controlled to 80° C. to be allowed to react for 3 hours. After the reaction, the particles were washed with methanol and dried to obtain a water resistant metal ion adsorbent comprising a target amino group-grafted ethylene-vinyl alcohol copolymer. Thus obtained metal ion adsorbent particles were classified using a sieve to obtain particles having a particle size from 150 μm to 300 μm, and then evaluated the amount of adsorption and elution rate of Pd. The results are shown in Table 1. The adsorbent had an average pore diameter of 1.09 μm and a functional group content of 4.5 mmol/g.

Comparative Example A-1

A commercially available ethylene-vinyl alcohol copolymer (manufactured by Kuraray Co., Ltd., F101) was pulverized, and then classified using a sieve to obtain particles having a particle size from 425 μm to 710 μm, and then evaluated the amount of adsorption and elution rate of Pd. The results are shown in Table 1.

Comparative Example A-2

A vinyl alcohol polymer (manufactured by Kuraray Co., Ltd., PVA117) was pulverized, and then classified using a sieve to obtain particles having a particle size from 212 μm to 425 μm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 0% and no graft polymerization was preceded. The amount of adsorption and elution rate of Pd of the obtained particles were tried to be evaluated. However, the particles swell intensely and could not be taken out.

Comparative Example A-3

Using a kneader (Labo Plastmill), 90 parts by mass of a vinyl alcohol polymer (manufactured by Kuraray Co., Ltd., PVA117) and 10 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 μm to 425 μm. Thus obtained particles were stirred in hot water at 100° C. for 2 hours. Most of the particles were dissolved into water and unable to be taken out.

Comparative Example A-4

The ethylene-vinyl alcohol copolymer particles having a particle size from 425 μm to 710 μm obtained in Comparative Example A-2 were irradiated by γ rays at 100 kGy, the irradiated materials were allowed to stand in air for one hour, then immersed in a 30% by mass vinylbenzyl trimethyl ammonium chloride aqueous solution purged with nitrogen at 70° C. to carry out graft polymerization for 24 hours with stirring to obtain graft particles. The graft particles were washed with water and dried. The graft ratio of the dried particles was evaluated as 33% (amount of functional group: 1.2 mmol/g). Thus obtained metal ion adsorbent particles were classified using a sieve to obtain particles having a particle size from 425 μm to 710 μm, and then evaluated the amount of adsorption and elution rate of Pd. The results are shown in Table 1.

Comparative Example A-5

The ethylene-vinyl alcohol copolymer having a particle size from 425 μm to 710 μm obtained in Example A-1 was irradiated by γ rays at 30 kGy, the irradiated materials were allowed to stand in air for one hour, then immersed in a 30% by mass vinylbenzyl trimethyl ammonium chloride aqueous solution purged with nitrogen at 70° C. to carry out graft polymerization for 24 hours with stirring to obtain graft particles. However, the particles swelled strongly and could not be taken out.

Comparative Example A-6

As the metal ion adsorbent, an anion exchange resin (Mitsubishi Chemical Corporation, Diaion SA10A) was used to evaluate the amount of adsorption and elution rate of Pd. The results are shown in Table 1.

Comparative Example A-7

As the metal ion adsorbent, an anion exchange resin (Mitsubishi Chemical Corporation, Diaion WA20) was used to evaluate the amount of adsorption and elution rate of Pd. The results are shown in Table 1.

TABLE 1

| | Base substrate for graft | | Graft copolymer | | | | Adsorption/elution performance | |
|---|---|---|---|---|---|---|---|---|
| | Polymer | Pore diameter (μm) | Graft ratio (%) | Added amine | Particle size (μm) | Pore diameter (μm) | Amino group (mmol/g) | Adsorption amount (mg/g) | Elution rate (%) |
| Example A-1 | EVOH | 0.60 | 281 | DETA | 425 to 710 | 0.51 | 9.6 | 330.6 | 99.0 |
| Example A-2 | EVOH | 1.56 | 216 | DETA | 425 to 710 | 1.45 | 8.8 | 288.5 | 98.5 |
| Example A-3 | EVOH | 0.83 | 366 | EDA | 425 to 710 | 0.71 | 7.7 | 286.2 | 99.2 |
| Example A-4 | EVOH | 0.95 | 174 | DETA | 215 to 500 | 0.84 | 8.5 | 256.7 | 98.3 |
| Example A-5 | EVOH | 0.15 | 278 | EDA | 215 to 500 | 0.10 | 7.2 | 266.4 | 99.0 |
| Example A-6 | EVOH | 3.46 | 303 | EDA | 1000 to 1400 | 2.85 | 7.4 | 186.5 | 98.5 |
| Example A-7 | EVOH | 0.60 | 132 | DETA | 425 to 710 | 0.58 | 6.2 | 156.5 | 99.5 |
| Example A-8 | EVOH | 0.60 | 281 | DMEDA | 425 to 710 | 0.46 | 6.5 | 270.5 | 82.5 |
| Example A-9 | EVOH | 0.60 | 389 | AEPy | 212 to 425 | 0.49 | 9.1 | 300.2 | 99.5 |
| Example A-10 | EVOH | 1.37 | 364 | PEI | 150 to 300 | 1.09 | 4.5 | 139.7 | 87.6 |
| Comparative Example A-1 | EVOH | — | — | — | — | — | — | 0.5 | — |
| Comparative Example A-2 | PVA | — | 0 | — | — | — | — | — | — |
| Comparative Example A-3 | PVA | — | — | — | — | — | — | — | — |
| Comparative Example A-4 | EVOH | — | 33 | VBTMAC | 425 to 710 | — | 1.2 | 47 | 83.3 |
| Comparative Example A-5 | EVOH | 0.60 | | VBTMAC | — | — | — | — | — |
| Comparative Example A-6 | Strong basic anion exchange resin | — | — | — | — | — | — | 187.2 | 43.9 |
| Comparative Example A-7 | Weak basic anion exchange resin | — | — | — | — | — | — | 110.6 | 95.6 |

DETA: diethylenetriamine,
EDA: ethylenediamine,
DMEDA: N,N'-dimethylethylenediamine,
AEPy: N-(2-aminoethyl)piperadine,
PEI: polyethyleneimine,
VBTMAC: vinylbenxzyltrimethylammonium chloride As clearly shown in Examples A-1 to A-10, since the adsorbents according to the present invention can adsorb as well as elute metal ions in an efficient way, they are effectively applicable for separating and recovering the metal ions.

As shown in Comparative Example A-1, the ethylene-vinyl alcohol does not exhibit metal ion adsorption performance by itself. Comparative Examples A-2 and A-3 each comprising the vinyl alcohol polymer as a base substrate are poor in water resistance. Where the quaternary ammonium salt is used as an adsorbing group, Comparative Example A-4 containing a small amount of quaternary ammonium salt cannot exhibit sufficient adsorption amount, whereas Comparative Example A-5 containing an increased amount of quaternary ammonium salt swells too much, resulting in failing to take out the adsorbent in the form of particles. The commercially available anion exchange materials as shown in Comparative Examples A-6 and A-7 cannot satisfy both the adsorption and the elution performance.

(Examples of Introducing a Graft Chain having an Aromatic Amino Group to EVOH)

Example B-1

Using a kneader (Labo Plastmill), 90 parts by mass of an ethylene-vinyl alcohol copolymer (manufactured by Kuraray Co., Ltd., F101) and 10 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to classify particles having a particle size from 212 µm to 425 µm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.60 µm. After irradiation of γ rays at 30 kGy to the porous particles, the irradiated materials were immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 247%. Further, the graft particles were immersed in a 20% by mass solution of 4-amino-1,2,4-triazol in isopropanol controlled to 80° C. to be allowed to react for 4 hours. After the reaction, the particles were washed with methanol and dried to obtain a water resistant metal ion adsorbent comprising an ethylene-vinyl alcohol copolymer having graft chains into which target nitrogen-containing heterocyclic aromatic rings were introduced. Thus obtained metal ion adsorbent particles were classified using a sieve to obtain particles having a particle size from 212 µm to 500 µm, and then evaluated the amount of adsorption and elution rate of Pd. The results are shown in Table 2. The adsorbent had an average pore diameter of 0.58 µm and a functional group content of 11.5 mmol/g.

Example B-2

The graft particles having a graft chain of glycidyl methacrylate in Example B-1 were immersed in a 20% by mass solution of 3-amino-1H-1,2,4-triazol in isopropanol controlled to 80° C. to be allowed to react for 4 hours. After the reaction, the particles were washed with methanol and dried to obtain a water resistant metal ion adsorbent comprising an ethylene-vinyl alcohol copolymer having graft chains into which target nitrogen-containing heterocyclic aromatic rings were introduced. Thus obtained metal ion adsorbent particles were classified using a sieve to obtain particles having a particle size from 212 µm to 500 µm, and then evaluated the amount of adsorption and elution rate of Pd. The results are shown in Table 2. The adsorbent had an average pore diameter of 0.50 µm and a functional group content of 10.1 mmol/g.

Example B-3

Using a kneader (Labo Plastmill), 80 parts by mass of an ethylene-vinyl alcohol copolymer (manufactured by Kuraray Co., Ltd., F101) and 20 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to classify particles having a particle size from 212 µm to 425 µm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.43 µm. After irradiation of γ rays at 30 kGy to the porous particles, the irradiated materials were immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 247%. Further, the graft particles were immersed in a 20% by mass solution of 1-(3-aminopropyl)imidazole in isopropanol controlled to 80° C. to be allowed to react for 4 hours. After the reaction, the particles were washed with methanol and dried to obtain a water resistant metal ion adsorbent comprising an ethylene-vinyl alcohol copolymer having graft chains into which target nitrogen-containing heterocyclic aromatic rings were introduced. Thus obtained metal ion adsorbent particles were classified using a sieve to obtain particles having a particle size from 212 µm to 500 µm, and then evaluated the amount of adsorption and elution rate of Pd. The results are shown in Table 2. The adsorbent had an average pore diameter of 0.40 µm and a functional group content of 8.5 mmol/g.

Example B-4

Using a kneader (Labo Plastmill), 60 parts by mass of an ethylene-vinyl alcohol copolymer (manufactured by Kuraray Co., Ltd., E105) and 40 parts by mass of a vinyl alcohol polymer (manufactured by Kuraray Co., Ltd., PVA217), both commercially available, were melt-kneaded for 3 minutes at 210° C., followed by cooling and solidifying the molten mixture, and pulverizing and sieving the solidified mixture to classify particles having a particle size from 212 µm to 425 µm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 1.46 µm. After irradiation of γ rays at 30 kGy to the porous particles, the irradiated materials were immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 223%. Further, the graft particles were immersed in a 20% by mass solution of 1-aminobenzotriazol in isopropanol controlled to 80° C. to be allowed to react for 4 hours. After the reaction, the particles were washed with methanol and dried to obtain a water resistant metal ion adsorbent comprising an ethylene-vinyl alcohol copolymer having graft chains into which target nitrogen-containing heterocyclic aromatic rings were introduced. Thus obtained metal ion adsorbent particles were classified using a sieve to obtain particles having a particle size from 212 µm to 500 µm, and then evaluated the amount of adsorption and elution rate of Pd. The results are shown in Table 2. The adsorbent had an average pore diameter of 1.39 µm and a functional group content of 10.1 mmol/g.

Comparative Example B-1

A commercially available ethylene-vinyl alcohol copolymer (manufactured by Kuraray Co., Ltd., E105) was pulverized, and then classified using a sieve to obtain particles having a particle size from 425 µm to 710 µm, then evaluated the adsorption amount of Pd. The results are shown in Table 2.

Comparative Example B-2

The glycidyl methacrylate-graft particles were classified using a sieve to obtain particles having a particle size from 212 µm to 500 µm, then evaluated the amount of adsorption of Pd. The results are shown in Table 2.

TABLE 2

|  | Substrate | Graft ratio (%) | Particle size (µm) | Pore diameter (µm) | Compound added | Functional group content (mmol/g) | Adsorption amount (mg/g) |
|---|---|---|---|---|---|---|---|
| Example B-1 | EVOH | 247 | 212 to 500 | 0.58 | 4-amino-1,2,4-triazole | 11.5 | 21.6 |
| Example B-2 | EVOH | 247 | 212 to 500 | 0.50 | 3-amino-1H-1,2,4-triazole | 10.1 | 14.2 |
| Example B-3 | EVOH | 270 | 212 to 500 | 0.40 | 1-(3-aminopropyl)imidazole | 8.5 | 19.8 |
| Example B-4 | EVOH | 223 | 212 to 500 | 1.39 | 1-aminobenzotriazole | 10.1 | 17.6 |
| Comparative Example B-1 | EVOH | — | 425 to 710 | — | — | — | 0.5 |
| Comparative Example B-2 | EVOH | 247 | 212 to 500 | 0.52 | — | — | 1.2 |

As clearly shown in Examples B-1 to B-4, since the adsorbents according to the present invention can adsorb the metal ions, they are effectively applicable for separating and recovering the metal ions.

As shown in Comparative Example B-1, the ethylene-vinyl alcohol does not exhibit metal ion adsorption performance by itself. Comparative Example B-2 having graft chains without amino groups also does not exhibit metal ion adsorption performance by itself.

(Examples Introducing a Graft Chain having a Thiourea Group or an Isothiourea Group to EVOH).

Example C-1

(1) Using a kneader (Labo Plastmill), 50 parts by mass of an ethylene-vinyl alcohol copolymer (manufactured by Kuraray Co., Ltd., F101) and 50 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to classify particles having a particle size from 106 µm to 212 µm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 1.56 µm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 210%.

(2) Further, the graft particles obtained in the above (1) were immersed in a 7% by mass thiourea aqueous solution dissolving 0.1 equivalent hydrochloric acid relative to thiourea controlled to 50° C. to be allowed to react for 3 hours. After the reaction, the particles were washed with water and dried, and then classified into particles having a particle size from 106 µm to 500 µm using a sieve to obtain a metal ion adsorbent on purpose having dry resistance. Thus obtained metal ion adsorbent had an introducing amount of a functional group of 1.4 mmol/g and an average pore diameter of 1.53 µm. The results are shown in Table 3-1.

Example C-2

Except for changing the ratio of hydrochloric acid relative to thiourea into 0.7 equivalent, a dry resistant metal ion adsorbent was produced in the same manner as in Example C-1. Thus obtained metal ion adsorbent had an introducing amount of a functional group of 2.2 mmol/g and an average pore diameter of 1.51 µm. The results are shown in Table 3-1.

Example C-3

Except for changing the ratio of hydrochloric acid relative to thiourea into 1.4 equivalent, a dry resistant metal ion adsorbent was produced in the same manner as in Example C-1. Thus obtained metal ion adsorbent had an introducing amount of a functional group of 2.3 mmol/g and an average pore diameter of 1.50 µm. The results are shown in Table 3-1.

Example C-4

(1) Using a kneader (Labo Plastmill), 60 parts by mass of an ethylene-vinyl alcohol copolymer (manufactured by Kuraray Co., Ltd., F101) and 40 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to classify particles having a particle size from 212 µm to 425 µm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 1.37 µm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 407%.

(2) Further, the graft particles obtained in the above (1) were immersed in a 12% by mass thiourea aqueous solution dissolving 0.7 equivalent hydrochloric acid relative to thiourea controlled to 80° C. to be allowed to react for 3 hours. After the reaction, the particles were washed with water and dried, and then classified into particles having a particle size from 425 µm to 710 µm using a sieve to obtain a metal ion adsorbent on purpose having dry resistance. Thus obtained metal ion adsorbent had an introducing amount of a functional group of 2.8 mmol/g and an average pore diameter of 1.30 µm. The results are shown in Table 3-1.

Example C-5

(1) Using a kneader (Labo Plastmill), 60 parts by mass of an ethylene-vinyl alcohol copolymer (manufactured by Kuraray Co., Ltd., E105) and 40 parts by mass of a vinyl alcohol polymer (manufactured by Kuraray Co., Ltd., PVA217), both commercially available, were melt-kneaded for 3 minutes at 210° C., followed by cooling and solidifying the molten mixture, and pulverizing and sieving the solidified mixture to classify particles having a particle size from 212 µm to 425 µm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 1.40 µm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 223%.

(2) Further, the particles obtained in the above (1) were immersed in a 12% by mass thiourea aqueous solution dissolving 1.4 equivalent hydrochloric acid relative to thiourea controlled to 80° C. to be allowed to react for 3 hours. After the reaction, the particles were washed with water and dried, and then classified into particles having a particle size from 425 µm to 710 µm using a sieve to obtain a metal ion adsorbent on purpose having dry resistance. Thus obtained metal ion adsorbent had an introducing amount of a functional group of 2.5 mmol/g and an average pore diameter of 1.34 µm. The results are shown in Table 3-1.

Example C-6

Using a kneader (Labo Plastmill), 90 parts by mass of an ethylene-vinyl alcohol copolymer (manufactured by Kuraray Co., Ltd., F101) and 10 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 µm to 425 µm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.27 µm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 274%. Further, the graft particles were immersed in a 53% by mass solution of diethylenetriamine in isopropanol controlled to 80° C. to be allowed to react for 3 hours. After the reaction, the particles were washed with methanol and dried to obtain a grafted ethylene-vinyl alcohol copolymer having amino groups. Further, the particle was immersed in a 40% by mass solution of methyl isothiocyanate in dioxane controlled to 80° C. to be allowed to react for 3 hours. After the reaction, the particles were washed with methanol and dried. Thus obtained metal ion adsorbent was classified into particles having a particle size from 212 µm to 500 µm using a sieve to obtain a metal ion adsorbent having dry resistance. Thus obtained metal ion adsorbent had an introducing amount of a functional group of 1.5 mmol/g and an average pore diameter of 0.21 µm. The results are shown in Table 3-1.

Example C-7

(1) Using a kneader (Labo Plastmill), 90 parts by mass of an ethylene-vinyl alcohol copolymer (manufactured by Kuraray Co., Ltd., F101) and 10 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to classify particles having a particle size from 212 µm to 425 µm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.27 µm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 274%.

(2) Further, the graft particles obtained in the above (1) were immersed in a 12% by mass thiourea aqueous solution dissolving 1.4 equivalent hydrochloric acid relative to thiourea controlled to 80° C. to be allowed to react for 3 hours. After the reaction, the particles were washed with water and dried, and then classified into particles having a particle size from 425 µm to 710 µm using a sieve to obtain a metal ion adsorbent on purpose having dry resistance. Thus obtained metal ion adsorbent had an introducing amount of a functional group of 2.6 mmol/g and an average pore diameter of 0.23 µm. The results are shown in Table 3-1.

Example C-8

Into a reactor, were charged 100 parts by mass of 3-bromopropyl methacrylate, 31 parts by mass of thiourea and 1200 parts by mass of ethanol to carry out reaction for 14 hours with heating under reflux. After removing the solvent, the resultant was purified by crystallization in isopropanol to obtain 112 parts by mass of 3-(carbamidoylthio) propyl methacrylate hydrobromide. Then using a kneader (Labo Plastmill), 80 parts by mass of an ethylene-vinyl alcohol copolymer (manufactured by Kuraray Co., Ltd., F101) and 20 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 µm to 425 µm. Thus obtained particles were stirred in hot water at 100° C. for 2 hours for extracting and removing only the vinyl alcohol polymer to obtain porous ethylene-vinyl alcohol copolymer particles.

The average pore diameter of the porous particles was 0.43 µm. After irradiation of γ rays at 30 kGy to the porous particles, the irradiated materials were allowed to stand in air for one hour, then immersed in a 10% by mass 3-(carbamidoylthio) propyl methacrylate hydrobromide aqueous solution purged with nitrogen at 80° C. to carry out graft polymerization for 90 minutes with stirring to obtain graft particles. The graft ratio of the dried particles was evaluated as 53%. Further, the graft particles were washed with a water/methanol mixed solution and dried and classified into particles having a particle size from 300 µm to 500 µm using a sieve to obtain a metal ion adsorbent having dry resistance. Thus obtained metal ion adsorbent had an introducing amount of a functional group of 1.5 mmol/g and an average pore diameter of 0.40 µm. The results are shown in Table 3-1.

Example C-9

Using a kneader (Labo Plastmill), 90 parts by mass of an ethylene-vinyl alcohol copolymer (manufactured by Kuraray Co., Ltd., F101) and 10 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 µm to 425 µm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.27 µm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 274%. Further, the graft particles were immersed in a 53% by mass solution of diethylenetriamine in isopropanol controlled to 80° C. to be allowed to react for 3 hours. After the reaction, the particles were washed with methanol and dried to obtain a grafted ethylene-vinyl alcohol copolymer having amino groups. Further, the particles were allowed to react with ammonium thiocyanate in water controlled to 100° C. for 12 hours. After the reaction, the particles were washed with water and dried. Thus obtained metal ion adsorbent was classified into particles having a particle size from 212 µm to 500 µm using a sieve to obtain a metal ion adsorbent having dry resistance. Thus obtained metal ion adsorbent had an introducing amount of a functional group of 1.3 mmol/g and an average pore diameter of 0.25 µm. The results are shown in Table 3-1.

Example C-10

Using a kneader (Labo Plastmill), 90 parts by mass of an ethylene-vinyl alcohol copolymer (manufactured by Kuraray Co., Ltd., F101) and 10 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 µm to 425 µm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.27 µm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 274%. Further, the graft particles were immersed in a 50% by mass solution of ethylenediamine in isopropanol controlled to 80° C. to be allowed to react for 3 hours. After the reaction, the particles were washed with methanol and dried to obtain an amino group-grafted ethylene-vinyl alcohol copolymer. Further, the particle was immersed in a 10% by mass sodium hydroxide aqueous solution controlled to 20° C. to be allowed to react with carbon disulfide for 2 hours. Then, butylamine was added to react for another 1 hour at 40° C. After the reaction, the particles were washed with methanol and dried. Thus obtained metal ion adsorbent was classified into particles having a particle size from 212 µm to 500 µm using a sieve to obtain a metal ion adsorbent having dry resistance. Thus obtained metal ion adsorbent had an introducing amount of a functional group of 1.2 mmol/g and an average pore diameter of 0.22 µm. The results are shown in Table 3-1.

Example C-11

Using the metal ion adsorbent obtained in Example C-1, adsorption amount of Pt was evaluated. The results are shown in Table 3-2.

Example C-12

Using the metal ion adsorbent obtained in Example C-2, adsorption amount of Pt was evaluated. The results are shown in Table 3-2.

Example C-13

Using the metal ion adsorbent obtained in Example C-3, adsorption amount of Pt was evaluated. The results are shown in Table 3-2.

Comparative Example C-1

A commercially available ethylene-vinyl alcohol copolymer (manufactured by Kuraray Co., Ltd., F101) was pulverized, and then classified using a sieve to obtain particles having a particle size from 425 µm to 710 µm, and then evaluated the adsorption amount of Pt. The results are shown in Table 3-2.

Comparative Example C-2

As the metal ion adsorbent, a chelate resin (Ajinomoto Fine-Techno Co., Ltd., MA-A) was dried under vacuum for 12 hours at room temperature, and was evaluated the adsorption amount of Pt. The results are shown in Table 3-2.

Comparative Example C-3

As the metal ion adsorbent, a chelate resin (Purolite International Ltd., Purolite S920) was dried under vacuum for 12 hours at room temperature, and was evaluated for adsorption of Pt. The results are shown in Table 3-2.

TABLE 3-1

| | Base substrate for graft | | Graft copolymer | | | |
|---|---|---|---|---|---|---|
| | Substrate | Pore diameter (μm) | Graft ratio (%) | Functional group | Functional group content (mmol/g) | Pore diameter (μm) |
| Example C-1 | EVOH | 1.56 | 210 | Isothiourea group | 1.4 | 1.53 |
| Example C-2 | EVOH | 1.56 | 210 | Isothiourea group | 2.2 | 1.51 |
| Example C-3 | EVOH | 1.56 | 210 | Isothiourea group | 2.3 | 1.50 |
| Example C-4 | EVOH | 1.37 | 407 | Isothiourea group | 2.8 | 1.30 |
| Example C-5 | EVOH | 1.40 | 223 | Isothiourea group | 2.5 | 1.34 |
| Example C-6 | EVOH | 0.27 | 274 | Thiourea group | 1.5 | 0.21 |
| Example C-7 | EVOH | 0.27 | 274 | Isothiourea group | 2.6 | 0.23 |
| Example C-8 | EVOH | 0.43 | 53 | Isothiourea group | 1.5 | 0.40 |
| Example C-9 | EVOH | 0.27 | 274 | Thiourea group | 1.3 | 0.25 |
| Example C-10 | EVOH | 0.27 | 274 | Thiourea group | 1.2 | 0.22 |

TABLE 3-2

| | Adsorption amount of Pt (mg/g) |
|---|---|
| Example C-11 | 62.7 |
| Example C-12 | 70.1 |
| Example C-13 | 86.6 |
| Comparative Example C-1 | 0.6 |
| Comparative Example C-2 | 43.9 |
| Comparative Example C-3 | 38.2 |

As shown in Examples C-1 to C-10, the production methods according to the present invention could obtain the ethylene-vinyl alcohol graft copolymers each having a thiourea structure or isothiourea structure. Further, the adsorption test results in Examples C-11 to C-13 carried out after drying the resin clearly reveal that the adsorbents according to the present invention are very effectively applicable for separating and recovering metal ions.

As shown in Comparative Example C-1, ethylene-vinyl alcohol does not exhibit metal ion adsorption performance by itself. The commercially available chelating resin as shown in Comparative Examples C-2 and C-3 could not exhibit metal ion adsorption performance after drying.

(Examples of Introducing a Graft Chain having a Carboxyl Group (Iminodiacetic Acid Group) in EVOH)

Example D-1

Using a kneader (Labo Plastmill), 50 parts by mass of an ethylene-vinyl alcohol copolymer (manufactured by Kuraray Co., Ltd., F101) and 50 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 106 μm to 212 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 1.56 μm. After irradiation of γ rays at 30 kGy to the porous particles, the irradiated materials were allowed to stand in air for one hour, then immersed in a 40% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 175%. Further, the graft particles were immersed in a 30% by mass disodium iminodiacetic acid aqueous solution controlled to 80° C. to be allowed to react for 3 hours. After the reaction, the particles were washed with water and dried to obtain a metal ion adsorbent comprising an iminodiacetic acid-grafted ethylene-vinyl alcohol copolymer. Thus obtained metal ion adsorbent particles were classified using a sieve to obtain particles having a particle size from 300 μm to 500 μm, and then evaluated adsorption performance to Cu, Co and Ni. The particle formulation and the evaluation of adsorption performance are shown in Tables 4-1 and 4-2, respectively. The adsorbent had an average pore diameter of 1.45 μm and a functional group content of 2.1 mmol/g (4.2 mmol/g as carboxyl group).

Example D-2

Using a kneader (Labo Plastmill), 90 parts by mass of an ethylene-vinyl alcohol copolymer (manufactured by Kuraray Co., Ltd., F101) and 10 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 106 μm to 212 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.27 μm. After irradiation of γ rays at 30 kGy to the porous particles, the irradiated materials were allowed to stand in air for one hour, then immersed in a 60% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 374%. Further, the graft particles were immersed in a 30% by mass disodium iminodiacetic acid aqueous solution controlled to 80° C. to be allowed to react for 3 hours. After the reaction, the particles were washed with water and dried to obtain a metal ion adsorbent comprising an iminodiacetic acid-grafted ethylene-vinyl alcohol copolymer. Thus obtained metal ion adsorbent particles were classified using a sieve to obtain particles having a particle size from 300 μm to 500 μm, and then evaluated adsorption performance to Cu, Co and Ni. The particle formulation and the evaluation of adsorption performance are shown in Tables 4-1 and 4-2, respectively. The adsorbent had an average pore diameter of 0.20 μm and a functional group content of 2.3 mmol/g (4.6 mmol/g as carboxyl group).

Example D-3

Using a kneader (Labo Plastmill), 70 parts by mass of an ethylene-vinyl alcohol copolymer (manufactured by Kuraray Co., Ltd., E105) and 30 parts by mass of a vinyl alcohol polymer (manufactured by Kuraray Co., Ltd., PVA217), both commercially available, were melt-kneaded for 3 minutes at 210° C., followed by cooling and solidifying the molten mixture, and pulverizing and sieving the solidified mixture to produce particles having a particle size from 106 μm to 212 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.46 μm. After irradiation of γ rays at 30 kGy to the porous particles, the irradiated materials were allowed to stand in air for one hour, then immersed in a 15% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 87%. Further, the graft particles were immersed in a 30% by mass disodium iminodiacetic acid aqueous solution controlled to 80° C. to be allowed to react for 3 hours. After the reaction, the particles were washed with water and dried to obtain a metal ion adsorbent comprising an iminodiacetic acid-grafted ethylene-vinyl alcohol copolymer. Thus obtained metal ion adsorbent particles 1 0 were classified using a sieve to obtain particles having a particle size from 106 μm to 212 μm, and then evaluated adsorption performance to Cu, Co, and Ni. The particle formulation and the evaluation of adsorption performance are shown in Tables 4-1 and 4-2, respectively. The adsorbent had an average pore diameter of 0.37 μm and a functional group content of 1.2 mmol/g (2.4 mmol/g as carboxyl group).

Example D-4

Using a kneader (Labo Plastmill), 60 parts by mass of an ethylene-vinyl alcohol copolymer (manufactured by Kuraray Co., Ltd., F101) and 40 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 1,180 μm to 1,400 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 1.37 μm. After irradiation of γ rays at 100 kGy to the porous particles, the irradiated materials were allowed to stand in air for one hour, then immersed in a 60% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 407%. Further, the graft particles were immersed in a 30% by mass disodium iminodiacetic acid aqueous solution controlled to 80° C. to be allowed to react for 3 hours. After the reaction, the particles were washed with water and dried to obtain a metal ion adsorbent comprising an iminodiacetic acid-grafted ethylene-vinyl alcohol copolymer. Thus obtained metal ion adsorbent particles were classified using a sieve to obtain particles having a particle size from 2,360 μm to 2,800 μm, and then evaluated adsorption performance to Cu, Co, and Ni. The particle formulation and the evaluation of adsorption performance are shown in Tables 4-1 and 4-2, respectively. The adsorbent had an average pore diameter of 1.16 μm and a functional group content of 2.5 mmol/g (5.0 mmol/g as carboxyl group).

Example D-5

Using a kneader (Labo Plastmill), 80 parts by mass of an ethylene-vinyl alcohol copolymer (manufactured by Kuraray Co., Ltd., L104) and 20 parts by mass of a vinyl alcohol polymer (manufactured by Kuraray Co., Ltd., PVA217), both commercially available, were melt-kneaded for 3 minutes at 210° C., followed by cooling and solidifying the molten mixture, and pulverizing and sieving the solidified mixture to produce particles having a particle size from 150 μm to 300 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.63 μm. After irradiation of γ rays at 100 kGy to the porous particles, the irradiated materials were allowed to stand in air for one hour, then immersed in a 60% by mass solution of glycidyl methacrylate in isopropanol purged with nitrogen at 80° C. to carry out graft polymerization for 90 minutes with stirring to obtain graft particles. The graft particles were washed with methanol and dried. The graft ratio of the dried particles was evaluated as 365%. Further, the graft particles were immersed in a 30% by mass disodium iminodiacetic acid aqueous solution controlled to 80° C. to be allowed to react for 3 hours. After the reaction, the particles were washed with water and dried. Further the dried parties were added into a 5% by mass calcium chloride aqueous solution and mixed with stirring for 1 hour at 40° C. The particles were washed with water and dried to obtain a metal ion adsorbent comprising an iminodiacetic acid-grafted ethylene-vinyl alcohol copolymer. Thus obtained metal ion adsorbent particles were classified using a sieve to obtain particles having a particle size from 212 μm to 425 μm, and then evaluated adsorption performance to Cu, Co, and Ni. The particle formulation and the evaluation of adsorption performance are shown in Tables 4-1 and 4-2, respectively. The adsorbent had an average pore diameter of 0.57 μm and a functional group content of 2.0 mmol/g (4.0 mmol/g as carboxyl group).

Comparative Example D-1

A commercially available ethylene-vinyl alcohol copolymer (manufactured by Kuraray Co., Ltd., E105) was pulverized, and then classified using a sieve to obtain particles having a particle size from 300 μm to 500 μm, and then evaluated the adsorption performance of Cu, Co and Ni. The evaluation of adsorption performance is shown in Table 4-2.

Comparative Example D-2

Commercially available chelating resin (manufactured by Purolite International Ltd., Purolite S930) was dried under vacuum for 12 hours at 40° C., and then evaluated the adsorption performance of Cu, Co and Ni. The evaluation of adsorption performance is shown in Table 4-2.

TABLE 4-1

| | Base substrate for graft | | Graft copolymer | | Functional |
|---|---|---|---|---|---|
| | Substrate | Pore diameter (μm) | Graft ratio (%) | Pore diameter (μm) | Particle size (μm) | group content (mmol/g) |
| Example D-1 | EVOH | 1.56 | 175 | 1.45 | 300 to 500 | 2.1 |
| Example D-2 | EVOH | 0.27 | 374 | 0.20 | 300 to 500 | 2.3 |
| Example D-3 | EVOH | 0.46 | 87 | 0.37 | 106 to 212 | 1.2 |
| Example D-4 | EVOH | 1.37 | 407 | 1.16 | 2360 to 2800 | 2.5 |
| Example D-5 | EVOH | 0.63 | 365 | 0.57 | 212 to 425 | 2.0 |

TABLE 4-2

| | Adsorption rate (%) | | |
|---|---|---|---|
| | Cu | Co | Ni |
| Example D-1 | 55.1 | 53.2 | 61.3 |
| Example D-2 | 61.1 | 58.2 | 67.8 |
| Example D-3 | 35.7 | 33.1 | 39.8 |
| Example D-4 | 32.0 | 30.4 | 35.5 |
| Example D-5 | 58.8 | 54.2 | 51.4 |
| Comparative Example D-1 | 0.7 | 0.5 | 0.8 |
| Comparative Example D-2 | 25.9 | 18.3 | 19.0 |

As shown in Examples D-1 to D-5, since the ethylene-vinyl alcohol graft copolymer particles shows excellent metal ion adsorption performance, they are effectively applicable for separating and recovering the metal ions.

As shown in Comparative Example D-1, the ethylene-vinyl alcohol does not exhibit metal ion adsorption performance by itself. The commercially available chelate resin of Comparative Example D-2 is deteriorated in dry resistance, resulting in failing to exhibit metal ion adsorption performance.

(Examples of Introducing a Graft Chain having an Ether Group or a Tertiary Amide Group in EVOH)

Example E-1

Using a kneader (Labo Plastmill), 90 parts by mass of an ethylene-vinyl alcohol copolymer (manufactured by Kuraray Co., Ltd., F101) and 10 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 μm to 425 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.27 μm. After irradiation of γ rays at 30 kGy to the porous particles, the irradiated materials were immersed in a 80% by mass solution of N,N'-diethylacrylamide in isopropanol purged with nitrogen at 80° C. to carry out graft polymerization for 90 minutes with stirring to obtain porous graft copolymer particles having a graft ratio of 72%. Thereafter the particles were washed with methanol and dried to obtain an adsorbent on purpose. Thus obtained metal ion adsorbent particles were classified using a sieve to obtain particles having a particle size from 300 μm to 500 μm, and then evaluated the adsorption performance to Au, Pd and Rh as well as the elution performance to Au. The particle formulation and the evaluation of adsorption/elution performance are shown in Tables 5-1 and 5-2, respectively. The adsorbent had an average pore diameter of 0.21 μm and a functional group content of 3.3 mmol/g.

Example E-2

Using a kneader (Labo Plastmill), 90 parts by mass of an ethylene-vinyl alcohol copolymer (manufactured by Kuraray Co., Ltd., F101) and 10 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 μm to 425 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.27 μm. After irradiation of γ rays at 30 kGy to the porous particles, the irradiated materials were immersed in a 60% by mass solution of tetrahydrofurfuryl methacrylate in isopropanol purged with nitrogen at 80° C. to carry out graft polymerization for 90 minutes with stirring to obtain porous graft copolymer particles having a graft ratio of 87%. Thereafter the particles were washed with methanol and dried to obtain an adsorbent on purpose. Thus obtained metal ion adsorbent particles were classified using a sieve to obtain particles having a particle size from 300 μm to 500 μm, and then evaluated adsorption performance to Au, Pd, Rh and elution performance to Au. The particle formulation and the evaluation of adsorption/elution performance are shown in Tables 5-1 and 5-2, respectively. The adsorbent had an average pore diameter of 0.19 μm and a functional group content of 2.7 mmol/g.

Example E-3

Using a kneader (Labo Plastmill), 70 parts by mass of an ethylene-vinyl alcohol copolymer (manufactured by Kuraray Co., Ltd., F101) and 30 parts by mass of a vinyl alcohol polymer (manufactured by Kuraray Co., Ltd., PVA217), both commercially available, were melt-kneaded for 3 minutes at 210° C., followed by cooling and solidifying the molten mixture, and pulverizing and sieving the solidified mixture to produce particles having a particle size from 212 μm to 425 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.88 μm. After irradiation of γ rays at 30 kGy to the porous particles, the irradiated materials were immersed in a 60% by mass solution of furfuryl methacrylate in isopropanol purged with nitrogen at 80° C. to carry out graft polymerization for 90 minutes with stirring to obtain porous graft copolymer particles having a graft ratio of 65%. Thereafter the particles were washed with methanol and dried to obtain an adsorbent on purpose. Thus obtained metal ion adsorbent particles were classified using a sieve to obtain particles having a particle size from 300 μm to 500 μm, and then evaluated adsorption performance to Au, Pd, Rh and elution performance to Au. The particle formulation and the evaluation of adsorption/elution performance are shown in Tables 5-1 and 5-2, respectively. The adsorbent had an average pore diameter of 0.79 μm and a functional group content of 2.3 mmol/g.

Example E-4

Using a kneader (Labo Plastmill), 60 parts by mass of an ethylene-vinyl alcohol copolymer (manufactured by Kuraray Co., Ltd., E105) and 40 parts by mass of a vinyl alcohol polymer (manufactured by Kuraray Co., Ltd., PVA217), both commercially available, were melt-kneaded for 3 minutes at 210° C., followed by cooling and solidifying the molten mixture, and pulverizing and sieving the solidified mixture to produce particles having a particle size from 1,180 μm to 1,400 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 1.40 μm. After irradiation of γ rays at 100 kGy to the porous particles, the irradiated materials were immersed in a 60% by mass solution of tetrahydrofurfuryl methacrylate in isopropanol purged with nitrogen at 80° C. to carry out graft polymerization for 90 minutes with stirring to obtain porous graft copolymer particles having a graft ratio of 100%. Thereafter the particles were washed with methanol and dried to obtain an adsorbent on purpose. Thus obtained metal ion adsorbent particles were classified using a sieve to obtain particles having a particle size from 2,360 μm to 2,880 μm, and then evaluated the adsorption performance to Au, Pd and Rh and the elution performance to Au. The particle formulation and the evaluation of adsorption/elution performance are shown in Tables 5-1 and 5-2, respectively. The adsorbent had an average pore diameter of 1.19 μm and a functional group content of 3.9 mmol/g.

Example E-5

Using a kneader (Labo Plastmill), 80 parts by mass of an ethylene-vinyl alcohol copolymer (manufactured by Kuraray Co., Ltd., F101) and 20 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 μm to 425 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 0.43 μm. After irradiation of γ rays at 30 kGy to the porous particles, the irradiated materials were immersed in a 40% by mass solution of N-vinylpyrrolidone in isopropanol purged with nitrogen at 80° C. to carry out graft polymerization for 90 minutes with stirring to obtain porous graft copolymer particles having a graft ratio of 54%. Thereafter the particles were washed with methanol and dried to obtain an adsorbent on purpose. Thus obtained metal ion adsorbent particles were classified using a sieve to obtain particles having a particle size from 300 μm to 500 μm, and then evaluated the adsorption performance to Au, Pd and Rh and the elution performance to Au. The particle formulation and the evaluation of adsorption/elution performance are shown in Tables 5-1 and 5-2, respectively. The adsorbent had an average pore diameter of 0.40 μm and a functional group content of 3.2 mmol/g.

Example E-6

Using a kneader (Labo Plastmill), 60 parts by mass of an ethylene-vinyl alcohol copolymer (manufactured by Kuraray Co., Ltd., F101) and 40 parts by mass of a vinyl alcohol polymer (manufactured by Kuraray Co., Ltd., PVA205), both commercially available, were melt-kneaded for 3 minutes at 210° C., followed by cooling and solidifying the molten mixture, and pulverizing and sieving the solidified mixture to produce particles having a particle size from 212 μm to 425 μm. Thus obtained particles were stirred in hot water at 100° C. for 2 hours for extracting and removing only the vinyl alcohol polymer to obtain porous ethylene-vinyl alcohol copolymer particles. The average pore diameter of the porous particles was 1.37 μm. After irradiation of γ rays at 30 kGy to the porous particles, the irradiated materials were immersed in a 60% by mass solution of diethylene glycol monomethyl ether methacrylate in isopropanol purged with nitrogen at 80° C. to carry out graft polymerization for 90 minutes with stirring to obtain porous graft copolymer particles having a graft ratio of 107%. Thereafter the particles were washed with methanol and dried to obtain an adsorbent on purpose. Thus obtained metal ion adsorbent particles were classified using a sieve to obtain particles having a particle size from 300 μm to 500 μm, and then evaluated the adsorption performance to Au, Pd and Rh and the elution performance to Au. The particle formulation and the evaluation of adsorption/elution performance are shown in Tables 5-1 and 5-2, respectively. The adsorbent had an average pore diameter of 1.20 μm and a functional group content of 2.8 mmol/g.

Comparative Example E-1

A commercially available ethylene-vinyl alcohol copolymer (manufactured by Kuraray Co., Ltd., F101) was pulverized and sieved to produce particles having a particle size from 212 μm to 425 μm substantially free from pores. After irradiation of γ rays at 30 kGy to the porous particles, the irradiated materials were immersed in a 50% by mass solution of tetrahydrofurfuryl methacrylate in isopropanol purged with nitrogen at 80° C. to carry out graft polymerization for 90 minutes with stirring to obtain porous graft copolymer particles having a graft ratio of 29%. Thereafter the particles were washed with methanol and dried to obtain an adsorbent on purpose. Thus obtained metal ion adsorbent particles were classified using a sieve to obtain particles having a particle size from 300 μm to 500 μm, and then evaluated adsorption performance to Au, Pd, Rh and elution performance to Au. The particle formulation and the evaluation of adsorption/elution performance are shown in Tables 5-1 and 5-2, respectively. The adsorbent had a functional group content of 1.3 mmol/g.

Comparative Example E-2

Commercially available polyethylene (manufactured by Prime Polymer Co., Ltd., 7000F) was pulverized and sieved to produce particles having a particle size from 212 μm to 425 μm substantially free from pores. After irradiation of γ rays at 200 kGy to the porous particles, the irradiated materials were immersed in a 80% by mass solution of N,N'-diethyl acrylamide in isopropanol purged with nitrogen at 80° C. to carry out graft polymerization for 90 minutes with stirring to obtain porous graft copolymer particles having a graft ratio of 25%. Thereafter the particles were washed with methanol and dried to obtain an adsorbent on purpose. Thus obtained metal ion adsorbent particles were classified using a sieve to obtain particles having a particle size from 300 μm to 500 μm, and then evaluated the adsorption performance to Au, Pd and Rh and the elution performance to Au. The particle formulation and the evaluation of adsorption/elution performance are shown in Tables 5-1 and 5-2, respectively. The adsorbent had a functional group content of 1.6 mmol/g.

Comparative Example E-3

Crosslinked polychloromethyl styrene (chloromethylene group content 6.55 mmol/g) particles were added to a 2% by mass solution of sodium hydroxide in isopropanol containing 20% by mass of tetrahydrofurfural, and heated under reflux for 5 hours. After that, the particles were washed with methanol and dried to give an adsorbent substantially free from pores. The amount of functional groups introduced to the adsorbent was 2.0 mmol/g. Thus obtained metal ion adsorbent particles were classified using a sieve to obtain particles having a particle size from 300 μm to 500 μm, and then evaluated the adsorption performance to Au, Pd and Rh and the elution performance to Au. The particle formulation and the evaluation of adsorption/elution performance are shown in Tables 5-1 and 5-2, respectively. The adsorbent had a functional group content of 2.0 mmol/g.

TABLE 5-1

| | Base substrate for graft | | Graft copolymer | | |
|---|---|---|---|---|---|
| | Substrate | Pore diameter (μm) | Pore diameter (μm) | Particle size (μm) | Functional group content (mmol/g) |
| Example E-1 | EVOH | 0.27 | 0.21 | 300 to 500 | 3.3 |
| Example E-2 | EVOH | 0.27 | 0.19 | 300 to 500 | 2.7 |
| Example E-3 | EVOH | 0.88 | 0.79 | 300 to 500 | 2.3 |
| Example E-4 | EVOH | 1.40 | 1.19 | 2360 to 2800 | 3.9 |
| Example E-5 | EVOH | 0.43 | 0.40 | 300 to 500 | 3.2 |
| Example E-6 | EVOH | 1.37 | 1.20 | 300 to 500 | 2.8 |
| Comparative Example E-1 | EVOH | — | — | 300 to 500 | 1.3 |
| Comparative Example E-2 | PE | — | — | 300 to 500 | 1.6 |
| Comparative Example E-3 | PCMS | — | — | 300 to 500 | 2.0 |

TABLE 5-2

| | Adsorption rate (%) | | | Elution rate (%) |
|---|---|---|---|---|
| | Au | Pt | Rh | Au |
| Example E-1 | 52.8 | 0.5 | 1.1 | 80.9 |
| Example E-2 | 62.6 | 0.2 | 0.6 | 81.1 |
| Example E-3 | 50.5 | 0.2 | 0.3 | 80.0 |

TABLE 5-2-continued

| | Adsorption rate (%) | | | Elution rate (%) |
|---|---|---|---|---|
| | Au | Pt | Rh | Au |
| Example E-4 | 32.5 | 0.0 | 0.0 | 82.3 |
| Example E-5 | 45.8 | 2.1 | 2.4 | 80.5 |
| Example E-6 | 85.6 | 1.0 | 1.1 | 84.2 |
| Comparative Example E-1 | 34.4 | 0.0 | 0.0 | 80.1 |
| Comparative Example E-2 | 38.1 | 0.6 | 0.9 | 75.4 |
| Comparative Example E-3 | 31.2 | 0.3 | 0.5 | 72.1 |

As shown in Examples E-1 to E-6, the adsorbents according to the present invention can adsorb only gold ions with high selectivity. Further, the adsorbents are capable of easily eluting and recovering the adsorbed gold ions with hot water without the need for special eluent. The adsorbents are effectively applicable for separating and recover gold.

In Comparative Example E-1, ethylene-vinyl alcohol copolymer without pore has a small amount of functional groups even after the graft polymerization, and is deteriorated in adsorption performance. In the case of polyethylene particles and cross-linked polychloromethylstyrene particles, their adsorption rates are poor compared with the adsorbents with pores.

(Examples of Introducing a Graft Chain having Adsorptive Functional Groups into Olefin Resin or Polyamide Resin other than EVOH)

Example F-1

Using a kneader (Labo Plastmill), 90 parts by mass of a polyethylene (manufactured by Prime Polymer Co., Ltd. 7000F) and 10 parts by mass of a polyvinylpyrrolidone (BASF Corp., Kollidon CL-M) (PVP), both commercially available, were melt-kneaded for 3 minutes at 230° C., followed by cooling and solidifying the molten mixture, and pulverizing and sieving the solidified mixture to produce particles having a particle size from 212 μm to 425 μm. Thus obtained particles were added into isopropanol (iPrOH) at 80° C. with stirring for 2 hours for extracting and removing only the polyvinylpyrrolidone to obtain porous polyethylene particles. After irradiation of γ rays at 100 kGy to the porous particles, the irradiated materials were immersed in a 40% by mass solution of tetrahydrofurfuryl methacrylate (THFMA) in isopropanol purged with nitrogen at 0° C. with stirring for 60 minutes, followed by elevating the temperature into 80° C. to carry out graft polymerization. Thereafter the obtained particles were washed with methanol and dried. Thus obtained porous graft copolymer particles had a graft ratio of 315%. The particles had an average pore diameter of 2.4 μm and a functional group content of 4.5 mmol/g. Thus obtained particles were classified into particles having a particle size from 212 µm to 425 µm using a sieve to obtain an ether group-grafted adsorbent, and then evaluated adsorption performance to Au. The evaluation of the adsorption performance to Au is shown in Table 6.

Example F-2

Using a kneader (Labo Plastmill), 90 parts by mass of a polypropylene (manufactured by Japan Polypropylene Corporation, Novatec PP MA3) (PP) and 10 parts by mass of a polyvinylpyrrolidone (BASF Corp., Kollidon CL-M) (PVP), both commercially available, were melt-kneaded for 3 minutes at 230° C., followed by cooling and solidifying the molten mixture, and pulverizing and sieving the solidified mixture to produce particles having a particle size from 106 µm to 300 µm. Thus obtained particles were added into isopropanol (iPrOH) at 80° C. with stirring for 2 hours for extracting and removing only the polyvinylpyrrolidone to obtain porous polypropylene particles. After irradiation of γ rays at 100 kGy to the porous particles, the irradiated materials were immersed in a 40% by mass solution of glycidyl methacrylate (GMA) in isopropanol purged with nitrogen at 0° C. with stirring for 60 minutes, followed by elevating the temperature into 80° C. to carry out graft polymerization. Thereafter the obtained particles were washed with methanol and dried. Thus obtained porous graft copolymer particles had a graft ratio of 545%. Further, the particles were immersed in a 50% by mass solution of diethylenetriamine (DETA) in isopropanol at 80° C. to react for 4 hours. After the reaction, the particles were washed with methanol and dried to obtain porous graft copolymer particles on purpose. The particles had an average pore diameter of 5.3 µm and a functional group content of 10.4 mmol/g. Thus obtained particles were classified into particles having a particle size from 106 µm to 300 µm using a sieve to obtain an amino group-grafted adsorbent, and then evaluated adsorption performance to Pb. The evaluation of adsorption performance to Pb is shown in Table 6.

Example F-3

Using a kneader (Labo Plastmill), 70 parts by mass of a polypropylene (manufactured by Japan Polypropylene Corporation, Novatec PP MA3) (PP) and 30 parts by mass of a polyvinylpyrrolidone (BASF Corp., Kollidon CL-M) (PVP), both commercially available, were melt-kneaded for 3 minutes at 230° C., followed by cooling and solidifying the molten mixture, and pulverizing and sieving the solidified mixture to produce particles having a particle size from 425 µm to 710 µm. Thus obtained particles were added into isopropanol (iPrOH) at 80° C. with stirring for 2 hours for extracting and removing only the polyvinylpyrrolidone to obtain porous polypropylene particles. After irradiation of γ rays at 100 kGy to the porous particles, the irradiated materials were immersed in a 40% by mass solution of N,N'-diethylacrylamide (DEAA) in isopropanol purged with nitrogen at 0° C. with stirring for 60 minutes, followed by elevating the temperature into 80° C. to carry out graft polymerization. Thereafter the obtained particles were washed with methanol and dried. Thus obtained porous graft copolymer particles had a graft ratio of 105%. The particles had an average pore diameter of 7.5 µm and a functional group content of 4.0 mmol/g. Thus obtained particles were classified into particles having a particle size from 425 µm to 710 µm using a sieve to obtain an amino-group-grafted adsorbent, and then evaluated adsorption performance to Au. The evaluation of adsorption performance is shown in Table 6.

Example F-4

Using a kneader (Labo Plastmill), 80 parts by mass of a nylon 6 (manufactured by Serva Co., polyamide-6 powder) and 20 parts by mass of a polyethylene glycol (Wako Co., Ltd., polyethylene glycol 20000), both commercially available, were melt-kneaded for 3 minutes at 230° C., followed by cooling and solidifying the molten mixture, and pulverizing and sieving the solidified mixture to produce particles having a particle size from 425 µm to 710 µm. Thus obtained particles were stirred in hot water at 100° C. for 2 hours for extracting and removing only the polyethylene glycol to obtain porous nylon 6 particles. After irradiation of γ rays at 100 kGy to the porous particles, the irradiated materials were immersed in a 40% by mass solution of glycidyl methacrylate in isopropanol purged with nitrogen at 0° C. with stirring for 60 minutes, followed by elevating the temperature into 80° C. to carry out graft polymerization. Thereafter the obtained particles were washed with methanol and dried. Thus obtained porous graft copolymer particles had a graft ratio of 250%. Further, the particles were immersed in a 50% by mass solution of diethylenetriamine in isopropanol at 80° C. to react for 4 hours. After the reaction, the particles were washed with methanol and further immersed in a 40% by mass solution of methyl isothiocyanate (MeNCS) in dioxane at 80° C. to react for another 3 hours. Then the particles were washed with methanol and dried to obtain a porous thiourea group-grafted adsorbent. The adsorbent particles had an average pore diameter of 1.8 µm and a functional group content of 5.0 mmol/g. Thus obtained particles were classified into particles having a particle size from 425 µm to 710 µm using a sieve to obtain a thiourea group-grafted adsorbent, and then evaluated adsorption performance to Pb. The evaluation of adsorption performance to Pt is shown in Table 6.

Example F-5

Using a kneader (Labo Plastmill), 90 parts by mass of a polypropylene (manufactured by Japan Polypropylene Corporation, Novatec PP MA3) (PP) and 10 parts by mass of polyvinylpyrrolidone (BASF Corp., Kollidon CL-M) (PVP), both commercially available, were melt-kneaded for 3 minutes at 230° C., followed by cooling and solidifying the molten mixture, and pulverizing and sieving the solidified mixture to produce particles having a particle size from 106 µm to 300 µm. Thus obtained particles were added into isopropanol (iPrOH) at 80° C. with stirring for 2 hours for extracting and removing only the polyvinylpyrrolidone to obtain porous polypropylene particles. After irradiation of γ rays at 100 kGy to the porous particles, the irradiated materials were immersed in a 40% by mass solution of glycidyl methacrylate (GMA) in isopropanol purged with nitrogen at 80° C. to carry out graft polymerization. Thereafter the obtained particles were washed with methanol and dried. Thus obtained porous graft copolymer particles had a graft ratio of 18%. Further, the particles were immersed in a 50% by mass solution of diethylenetriamine (DETA) in isopropanol at 80° C. to react for 4 hours. After the reaction, the particles were washed with methanol and dried to obtain porous graft copolymer particles on purpose. The particles had an average pore diameter of 5.3 µm and a functional group content of 2.9 mmol/g. Thus obtained particles were classified into particles having a particle size from 106 µm to 300 µm using a sieve to obtain an amino group-grafted adsorbent, and then evaluated adsorption performance to Pd. The evaluation of adsorption performance to Pb is shown in Table 6.

Comparative Example F-1

Using a kneader (Labo Plastmill), commercially available polyethylene (manufactured by Prime Polymer Co., Ltd. 7000F) was melt-kneaded for 3 minutes at 230° C., followed by cooling and solidifying the molten mixture, and pulverizing and sieving the solidified mixture to produce particles (free from pore) having a particle size from 212 μm to 425 μm. After irradiation of γ rays at 100 kGy to the porous particles, the irradiated materials were immersed in a 40% by mass solution of tetrahydrofurfuryl methacrylate (THFMA) in isopropanol purged with nitrogen at 0° C. with stirring for 60 minutes, followed by elevating the temperature into 80° C. to carry out graft polymerization. Thereafter, the resultant particles were washed with methanol and dried. The obtained porous graft copolymer particles had a graft ratio of 70%. The particles had a functional group content of 2.3 mmol/g. Thus obtained particles were classified into particles having a particle size from 212 μm to 425 μm using a sieve to obtain an ether-group-grafted adsorbent, and then evaluated adsorption performance to Au. The evaluation of adsorption performance to Au is shown in Table 6.

Comparative Example F-2

Using a kneader (Labo Plastmill), commercially available polypropylene (manufactured by Japan Polypropylene Corporation, Novatec PP MA3) was melt-kneaded for 3 minutes at 230° C., followed by cooling and solidifying the molten mixture, and pulverizing and sieving the solidified mixture to produce particles (no pores) having a particle size from 425 μm to 710 μm. After irradiation of γ rays at 100 kGy to the porous particles, the irradiated materials were immersed in a 40% by mass solution of N,N'-diethyl acrylamide in isopropanol purged with nitrogen at 0° C. with stirring for 60 minutes, followed by elevating the temperature into 80° C. to carry out graft polymerization. Thereafter, the resultant particles were washed with methanol and dried. Thus obtained porous graft copolymer particles had a graft ratio of 45%. The particles had a functional group content of 2.4 mmol/g. Thus obtained particles were classified into particles having a particle size from 425 μm to 710 μm using a sieve to obtain an amide group-grafted adsorbent, and then evaluated adsorption performance to Au. The evaluation of adsorption performance to Au is shown in Table 6.

Comparative Example F-3

Using a kneader (Labo Plastmill), a nylon 6 (manufactured by Serva Co., polyamide-6 powder) was melt-kneaded for 3 minutes at 230° C., followed by cooling and solidifying the molten mixture, and pulverizing and sieving the solidified mixture to produce particles (free from pore) having a particle size from 300 μm to 500 μm. After irradiation of γ rays at 100 kGy to the porous particles, the irradiated materials were immersed in a 40% by mass solution of glycidyl methacrylate in isopropanol purged with nitrogen at 0° C. with stirring for 60 minutes, followed by elevating the temperature into 80° C. to carry out graft polymerization. Thereafter, the resultant particles were washed with methanol and dried. The graft ratio of the particles was 95%. Further, the particles were immersed in a 50% by mass solution of trimethylamine in isopropanol at 80° C. to react for 4 hours. After the reaction, the particles were washed with methanol and further immersed in a 40% by mass solution of methyl isothiocyanate in dioxane at 80° C. to react for another 3 hours. Then the particles were washed with methanol and dried to obtain thiourea group-grafted particles. The particles had a functional group content of 2.8 mmol/g. Thus obtained particles were classified into particles having a particle size from 300 μm to 500 μm using a sieve to obtain a thiourea group-grafted adsorbent, and then evaluated adsorption performance to Pt. The evaluation of adsorption performance to Au is shown in Table 6.

TABLE 6

| | Polymer A | Formulation (%) | Polymer B | Formulation (%) | Particle diameter (μm) | Extraction solvent | Graft monomer | Graft ratio (%) | Subsequent addition | Functional group content (mmol/g) | Pore diameter (μm) | Metal species | Adsorption rate (%) |
|---|---|---|---|---|---|---|---|---|---|---|---|---|---|
| Example F-1 | PE | 90 | PVP | 10 | 212 to 425 | iPrOH | THFMA | 315 | — | 4.5 | 2.4 | Au | 95 |
| Example F-2 | PP | 90 | PVP | 10 | 106 to 300 | iPrOH | GMA | 545 | DETA | 10.4 | 5.3 | Pd | 99 |
| Example F-3 | PP | 70 | PVP | 30 | 425 to 710 | iPrOH | DEAA | 105 | — | 4.0 | 7.5 | Au | 71 |
| Example F-4 | Nylon6 | 90 | PEG | 20 | 425 to 710 | H$_2$O | GMA | 250 | DETA, MeNCS | 5.0 | 1.8 | Pt | 98 |
| Example F-5 | PP | 90 | PVP | 10 | 106 to 300 | iPrOH | GMA | 18 | DETA | 2.9 | 5.3 | Pd | 60 |
| Comparative Example F-1 | PE | 100 | — | — | 212 to 425 | — | THFMA | 70 | — | 2.3 | — | Au | 53 |
| Comparative Example F-2 | PP | 100 | — | — | 425 to 710 | — | DEAA | 45 | — | 2.4 | — | Au | 48 |
| Comparative Example F-3 | Nylon6 | 100 | — | — | 300 to 500 | — | GMA | 95 | DETA, MeNCS | 2.8 | — | Pt | 58 |

As can be seen from Examples F-1 to F-5, the present invention achieved obtaining porous graft copolymer particles having adsorption functional groups in a large content so as to be excellent in metal adsorption.

As can be seen from Comparative Examples F-1 to F-3, the graft copolymer particles without having porous structures do not have sufficient adsorptive functional group content because of insufficient graft ratio, resulting in deteriorated metal adsorption performance.

(Examples of Introducing a Graft Chain having a Methylglucamine Group to EVOH)

Example G-1

Using a kneader (Labo Plastmill), 90 parts by mass of an ethylene-vinyl alcohol (manufactured by Kuraray Co., Ltd., F101, MFR: 3.8 g/10 minutes) and 10 parts by mass of a vinyl alcohol polymer (manufactured by Kuraray Co., Ltd., PVA205), both commercially available, were melt-kneaded, followed by cooling and solidifying the molten mixture, and pulverizing and sieving the solidified mixture to produce particles having a particle size from 1,180 µm to 1,400 µm. Thus obtained particles were treated with hot water for removing the vinyl alcohol polymer to obtain porous ethylene-vinyl alcohol copolymer particles. The porous particles had an average pore major axis size of 0.36 µm. After irradiation of ionizing radiation at 60 kGy to the porous particles, the irradiated materials were allowed to stand in air at 25° C. for one hour, then immersed in a solution of glycidyl methacrylate in isopropanol purged with nitrogen at 80° C. to carry out graft polymerization with stirring to obtain graft particles. The graft ratio of the particles was evaluated as 407%. Further, the particles were immersed in an N-methylglucamine aqueous solution controlled to 80° C. to carry out addition reaction of N-methylglucamine to obtain a metal ion adsorbent comprising a target N-methylglucamine group-grafted ethylene-vinyl alcohol copolymer. The porous particles had a functional group content of 2.6 mmol/g and an average pore diameter of 0.32 µm. Thus obtained ethylene-vinyl alcohol copolymer particles were classified using a sieve to obtain particles having a particle size from 2,360 µm to 2,800 µm, and then evaluated the adsorption amount of boron. The particle formulation and the adsorption results are shown in Tables 7-1 and 7-2, respectively.

Example G-2

Using a kneader (Labo Plastmill), 90 parts by mass of an ethylene-vinyl alcohol (manufactured by Kuraray Co., Ltd., G156, MFR: 15 g/10 minutes) and 10 parts by mass of a vinyl alcohol polymer (manufactured by Kuraray Co., Ltd., PVA217), both commercially available, were melt-kneaded, followed by cooling and solidifying the molten mixture, and pulverizing and sieving the solidified mixture to produce particles having a particle size from 212 µm to 425 µm. Thus obtained particles were treated with hot water for extracting and removing only the vinyl alcohol polymer to obtain porous ethylene-vinyl alcohol copolymer particles. The porous particles had an average pore major axis size of 0.95 µm. After irradiation of ionizing radiation at 100 kGy to the porous particles, the irradiated materials were allowed to stand in air at 25° C. for one hour, then immersed in a solution of glycidyl methacrylate in isopropanol purged with nitrogen at 80° C. to carry out graft polymerization with stirring to obtain graft particles. The graft ratio of the particles was evaluated as 370%. Further, the particles were immersed in an N-methylglucamine aqueous solution controlled to 80° C. to carry out addition reaction of N-methylglucamine to obtain a metal ion adsorbent comprising a target N-methylglucamine group-grafted ethylene-vinyl alcohol copolymer. The porous particles had a functional group content of 2.3 mmol/g and an average pore diameter of 0.90 µm. Thus obtained ethylene-vinyl alcohol copolymer particles were classified using a sieve to obtain particles having a particle size from 212 µm to 500 µm, and then evaluated the adsorption amount of boron. The particle formulation and the adsorption results are shown in Tables 7-1 and 7-2, respectively.

Example G-3

Using a kneader (Labo Plastmill), 90 parts by mass of an ethylene-vinyl alcohol (manufactured by Kuraray Co., Ltd., F101, MFR: 3.8 g/10 minutes) and 10 parts by mass of a vinyl alcohol polymer (manufactured by Kuraray Co., Ltd., PVA205), both commercially available, were melt-kneaded, followed by cooling and solidifying the molten mixture, and pulverizing and sieving the solidified mixture to produce particles having a particle size from 106 µm to 212 µm. Thus obtained particles were treated with hot water for removing the vinyl alcohol polymer to obtain porous ethylene-vinyl alcohol copolymer particles. The porous particles had an average pore major axis size of 0.27 µm. After irradiation of ionizing radiation at 100 kGy to the porous particles, the irradiated materials were allowed to stand in air at 25° C. for one hour, then immersed in a 40% by mass solution of glycidyl methacrylate in isopropanol purged with nitrogen at 80° C. to carry out graft polymerization with stirring to obtain graft particles. The graft ratio of the particles was evaluated as 371%. Further, the particles were immersed in an N-methylglucamine aqueous solution controlled to 80° C. to carry out addition reaction of N-methylglucamine to obtain a metal ion adsorbent comprising a target N-methylglucamine group-grafted ethylene-vinyl alcohol copolymer. The porous particles had a functional group content of 2.4 mmol/g and an average pore diameter of 0.24 µm. Thus obtained ethylene-vinyl alcohol copolymer particles were classified using a sieve to obtain particles having a particle size from 212 µm to 500 µm, and then evaluated the adsorption amount of boron. The particle formulation and the adsorption results are shown in Tables 7-1 and 7-2, respectively.

Example G-4

Using a kneader (Labo Plastmill), 80 parts by mass of an ethylene-vinyl alcohol (manufactured by Kuraray Co., Ltd., L104, MFR: 8.9 g/10 minutes) and 20 parts by mass of a vinyl alcohol polymer (manufactured by Kuraray Co., Ltd., PVA205), both commercially available, were melt-kneaded, followed by cooling and solidifying the molten mixture, and pulverizing and sieving the solidified mixture to produce particles having a particle size from 300 µm to 500 µm. Thus obtained particles were treated with hot water for extracting and removing only the vinyl alcohol polymer to obtain porous ethylene-vinyl alcohol copolymer particles. The porous particles had an average pore major axis size of 0.41 µm. After irradiation of ionizing radiation at 20 kGy to the porous particles, the irradiated materials were allowed to stand in air at 25° C. for one hour, then immersed in a solution of glycidyl methacrylate in isopropanol purged with nitrogen at 80° C. to carry out graft polymerization with stirring to obtain graft particles. The graft ratio of the particles was evaluated as 269%. Further, the particles were immersed in an aqueous N-methylglucamine solution controlled to 80° C. to carry out addition reaction of N-methylglucamine to obtain a metal ion adsorbent comprising a target N-methylglucamine group-grafted ethylene-vinyl alcohol copolymer. The porous particles had a functional group content of 2.1 mmol/g and an average pore diameter of 0.36 µm. Thus obtained ethylene-vinyl alcohol copolymer particles were classified using a sieve to obtain particles having a particle size from 212 µm to 500 µm, and then evaluated the adsorption amount of boron. The particle formulation and the adsorption results are shown in Tables 7-1 and 7-2, respectively.

Example G-5

The metal ion adsorbent in Example G-4 was evaluated for adsorption of arsenic. The particle formulation and the adsorption results are shown in Tables 7-1 and 7-2, respectively.

TABLE 7-1

| | Polymeric base substrate | | Adsorbent | | |
|---|---|---|---|---|---|
| | Substrate | Pore diameter (μm) | Pore diameter (μm) | Final particle diameter (μm) | Functional group content (mmol/g) |
| Example G-1 | EVOH | 0.36 | 0.32 | 2360 to 2800 | 2.6 |
| Example G-2 | EVOH | 0.95 | 0.90 | 212 to 500 | 2.3 |
| Example G-3 | EVOH | 0.27 | 0.23 | 212 to 500 | 2.4 |
| Example G-4 | EVOH | 0.41 | 0.36 | 212 to 500 | 2.1 |
| Example G-5 | EVOH | 0.41 | 0.36 | 212 to 500 | 2.1 |

TABLE 7-2

| | Adsorbed element | Adsorption amount (mg/g) |
|---|---|---|
| Example G-1 | B | 16.9 |
| Example G-2 | B | 21.1 |
| Example G-3 | B | 24.0 |
| Example G-4 | B | 18.4 |
| Example G-5 | As | 6.0 |

As shown in Examples G-1 to G-4, as for ethylene-vinyl alcohol copolymers carried out graft polymerization by ionizing radiation, after irradiation of ionizing radiation, a graft polymerization proceeds relatively stable even leaving the copolymers stand at room temperature so as to obtain ethylene-vinyl alcohol graft copolymers comprising N-methylglucamine group-introduced graft chains. In addition, the obtained ethylene-vinyl alcohol-based graft copolymer showed adsorption performance with respect to semimetals such as arsenic and boron.

INDUSTRIAL APPLICABILITY

According to the present invention, it is possible to provide an industrially applicable novel porous graft copolymer particle, and an adsorbent using the same having high adsorption properties for metal and others. Since the adsorbent can recover, for example, metals such as platinum group metals, gold, silver, copper, nickel, chromium, vanadium, cobalt, lead, zinc, mercury and cadmium, the adsorbent has industrial applicability.

Preferred embodiments of the present invention are shown and described. It is to be understood that various changes, modifications and omissions may be made without departing from the spirit of the present invention and are encompassed in the scope of the claims.

Accordingly, such changes and modifications should be construed as within the scope of the invention defined by the claims.

What is claimed is:
1. A porous graft copolymer particle comprising:
a graft copolymer having a porous particulate shape, wherein
the graft copolymer comprises at least one resin selected from the group consisting of an olefin resin, a water-insoluble modified polyvinyl alcohol resin, an amide resin, a cellulosic resin, a chitosan resin and a (meth)acrylate resin,
the at least one resin has at least one graft chain introduced thereinto,
the porous graft copolymer particle has an average pore diameter of from 0.01 μm to 50 μm on the surface thereof, and
a graft ratio is from 90 to 900 parts by mass based on 100 parts by mass of the at least one resin.
2. The porous graft copolymer particle as claimed in claim 1, wherein the water-insoluble modified polyvinyl alcohol resin is an ethylene-vinyl alcohol copolymer.
3. The porous graft copolymer particle as claimed in claim 1, wherein the graft chain includes a structural unit having a functional group.
4. The porous graft copolymer particle as claimed in claim 1, wherein graft chain includes a structural unit having at least one functional group selected from the group consisting of an amino group, an amide group, an ether group, a carboxyl group, a thiourea group, an isothiourea group, a phosphoric acid group, a phosphonic acid group, an amidoxime group, a nitrile group, a sulfonyl group, an N-methylglucamine group, an epoxy group and a thiol group.
5. The porous graft copolymer particle as claimed in claim 4, wherein the graft chain comprises a structural unit having at least one functional group selected from the group consisting of an amino group, an ether group, an isothiourea group and a thiourea group.
6. The porous graft copolymer particle as claimed in claim 3, wherein the number of moles of the functional group per unit mass of the porous graft polymer particles is 1.0 mmol/g or more.
7. The porous graft copolymer particle as claimed in claim 1, wherein the particle size is from 10 μm to 2,000 μm.
8. An adsorbent comprising the porous graft copolymer particle of claim 1.
9. The adsorbent as claimed in claim 8, wherein the adsorbent is an adsorbent for metal adsorption.
10. The porous graft copolymer particle of claim 1, wherein the average pore diameter is from 0.2 μm to 10 μm.
11. The porous graft copolymer particle of claim 4, wherein the number of moles of the functional group per unit mass of the porous graft copolymer particle is 2.0 mmol/g or more.

* * * * *